US012801050B2

(12) United States Patent
Nozaki et al.

(10) Patent No.: US 12,801,050 B2
(45) Date of Patent: Nov. 17, 2026

(54) TONER

(71) Applicant: CANON KABUSHIKI KAISHA, Tokyo (JP)

(72) Inventors: Dai Nozaki, Shizuoka (JP); Masaya Komuro, Shizuoka (JP); Kenji Ookubo, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 386 days.

(21) Appl. No.: 18/663,555

(22) Filed: May 14, 2024

(65) Prior Publication Data

US 2024/0385546 A1 Nov. 21, 2024

(30) Foreign Application Priority Data

May 18, 2023 (JP) ................................ 2023-082367

(51) Int. Cl.

| | |
|---|---|
| ***G03G 9/08*** | (2006.01) |
| ***G03G 9/087*** | (2006.01) |
| ***G03G 9/09*** | (2006.01) |

(52) U.S. Cl.

CPC ......... *G03G 9/0904* (2013.01); *G03G 9/0817* (2013.01); *G03G 9/0821* (2013.01); *G03G 9/0827* (2013.01); *G03G 9/08755* (2013.01)

(58) Field of Classification Search

CPC .. G03G 9/0904; G03G 9/0817; G03G 9/0821; G03G 9/0827; G03G 9/08755

See application file for complete search history.

(56) References Cited

U.S. PATENT DOCUMENTS

| | | | | |
|---|---|---|---|---|
| 9,658,549 | B2 | 5/2017 | Tanaka | |
| 9,880,478 | B2 | 1/2018 | Shimano | |
| 10,054,866 | B2 | 8/2018 | Tanaka | |
| 10,545,420 | B2 | 1/2020 | Kinumatsu | |
| 11,249,412 | B2 | 2/2022 | Kawamura | |
| 11,714,363 | B2 | 8/2023 | Ookubo | |
| 2006/0063085 | A1 * | 3/2006 | Lee ...................... | G03G 9/0819 430/108.7 |
| 2022/0128915 | A1 | 4/2022 | Toyoda | |
| 2022/0128916 | A1 | 4/2022 | Yoshida | |
| 2022/0128919 | A1 | 4/2022 | Kawamura | |
| 2022/0146952 | A1 | 5/2022 | Komiya | |
| 2022/0146955 | A1 | 5/2022 | Nozaki | |
| 2022/0171301 | A1 | 6/2022 | Suzumura | |
| 2022/0365457 | A1 | 11/2022 | Unno | |
| 2023/0015518 | A1 | 1/2023 | Nozaki | |
| 2023/0273539 | A1 | 8/2023 | Katsura | |
| 2023/0273543 | A1 | 8/2023 | Tanaka | |
| 2023/0384702 | A1 | 11/2023 | Adachi | |
| 2023/0400789 | A1 | 12/2023 | Komuro | |
| 2024/0019792 | A1 | 1/2024 | Isono | |
| 2024/0027929 | A1 | 1/2024 | Ookubo | |
| 2024/0219852 | A1 | 7/2024 | Tanaka | |

FOREIGN PATENT DOCUMENTS

| | | | |
|---|---|---|---|
| JP | 2007-58117 | A | 3/2007 |
| JP | 2011-197328 | A | 10/2011 |
| JP | 2017-219823 | A | 12/2017 |
| JP | 2019-184795 | A | 10/2019 |
| JP | 2022-92582 | A | 6/2022 |

* cited by examiner

*Primary Examiner* — Peter L Vajda
*Assistant Examiner* — Charles Collins Sullivan, IV
(74) *Attorney, Agent, or Firm* — VENABLE LLP

(57) ABSTRACT

A toner includes: a toner particle including a pigment; a resin particle; and an external additive. The resin particle has specific brightness average value and average circle-equivalent diameter, the brightness average value of the toner particle falls within a specific range, the pigment is a black pigment, the number of the resin particle falls within a specific range, and the toner particle and the resin particle each have at the surface thereof a PET structure. In the load displacement curve obtained by micro compression measurement of the resin particle, 90 number % or more thereof each do not have a fracture point at a load within a range of 0 to 10 mN.

10 Claims, No Drawings

TONER

BACKGROUND OF THE INVENTION

Field of the Invention

The present disclosure relates to a toner for use in an image-forming method such as an electrophotographic method.

Description of the Related Art

In recent years, an increase in speed of a copier or a printer and the improvement of environmental stability have been progressed. Also, at the time of high-speed printing, or when a change is caused in usage environment such as low temperatures and low humidities or high temperatures and high humidities, a toner that provides a stable image quality is required. Further, other than the performances of a printer, social awareness is also growing for preservation of the global environment, hence use of environmentally friendly materials has to be considered for printer materials such as a toner. As the plastic materials widely used in the society, polyethylene terephthalate (PET) is exemplified. PET is one of the plastic materials capable of reducing the plastic waste because the method of recycle after use thereof has been established, and the recycled material can also be used as a raw material.

With the electrophotographic method, first, a latent image bearing member is charged by various means, and is exposed to a light, thereby forming an electrostatic latent image on the latent image bearing member surface. Then, the electrostatic latent image is developed with a toner, thereby forming a toner image. The toner image is transferred to a transfer material such as paper, and then, the toner image is fixed on the transfer material by heating and pressurizing, resulting in a copied article or a print. In such an image forming process, the toner left on the latent image bearing member surface after transfer of the toner image is required to be removed (cleaned) with any method.

As the method for cleaning the toner left on the latent image bearing member, a method, in which the edge of the cleaning blade including an elastic material of urethane rubber or the like is brought into contact with the latent image bearing member surface, has been widely used. Although an increase in contact pressure of the cleaning blade improves the cleaning performance, chipping of the blade, abrasion of the latent image bearing member, and an unusual sound due to the chatter vibration of the blade become more likely to be caused. An increase in process speed for a higher speed of printing makes the negative effects more likely to be caused. Namely, it tends to become difficult to combine the cleaning performance and the durability of the member in a higher-speed copier or printer main body.

Further, when PET is used as the constituent material for a toner binder, the PET has a higher glass transition temperature Tg as compared with commonly used toner binder materials, and becomes harder. For this reason, although the durability against external additive embedding becomes stronger, a definite interface tends to be formed between an internal additive material of a toner, particularly, carbon black, i.e., a black pigment, and a binder, and cracking or chipping of the toner tends to be caused from such as site serving as the starting point thereof. The toner undergone cracking/chipping becomes more likely to be supplied to the cleaning part, and hence largely adversely affects the cleaning member.

This phenomenon becomes particularly obvious for a higher-speed copier or printer. For this reason, the cleaning performance as the toner is required to be further improved.

To address the problem, for example, Japanese Patent Application Publication No. 2017-219823 proposes a toner including both of a positively chargeable lubricant particle and a negatively chargeable lubricant particle. It is disclosed as follows. The positively chargeable lubricant particle and the negatively chargeable lubricant particle are mounted on the latent image part and the non-latent image part of the latent image bearing member surface, respectively. For this reason, a favorable cleaning performance not dependent upon the image line ratio is exhibited.

Japanese Patent Application Publication No. 2019-184795 discloses as follows. Inclusion of at least two kinds of strontium titanate fine particles having different particle diameters as external additives forms a blocking layer at the cleaning part, resulting in an improvement of the cleaning performance of the toner.

SUMMARY OF THE INVENTION

However, even when such a measure is used, there is still room for improvement of the durability test stability of the cleaning part of a toner including a resin having a PET structure and a black pigment in a higher-speed copier or printer.

The present disclosure provides a toner with which the problem can be addressed. The present disclosure is targeted for a toner that is capable of suppressing contamination in a charging roller by faulty cleaning and image defects caused thereby under low temperature low humidity environment and ordinary temperatures ordinary humidities environment, and that exhibits a further favorable image density, even when large quantities of printing is performed over a long term with a toner including a resin having a PET structure and a black pigment.

The present disclosure relates to a toner comprising:

a toner particle comprising a pigment;

a resin particle; and an external additive, wherein a brightness average value on the basis of a monochrome 256 gradation of the resin particle is 90 to 120, and an average circle-equivalent diameter of the resin particle is 0.5 to 3.0 μm, a brightness average value on the basis of a monochrome 256 gradation of the toner particle is 40 to 80, the pigment is a black pigment, a number of the resin particle in the toner is 5 to 40 for every 100 toner particles, the toner particle comprises at a surface thereof a resin having a repeating structure of a structure expressed by formula (1) below, the resin particle comprises at a surface thereof a resin having a repeating structure of a structure expressed by formula (1) below, and in a load displacement curve obtained by micro compression measurement of the resin particle, 90 number % or more of the resin particle does not have a fracture point at a load within a range 0 to 10 mN.

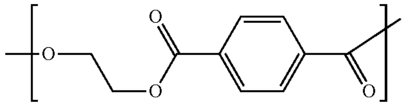

(1)

The present disclosure is targeted for a toner that is capable of suppressing contamination in a charging roller by faulty cleaning and image defects caused thereby under low temperature low humidity environment and ordinary temperatures ordinary humidities environment, and that exhibits a further favorable image density, even when large quantities of printing is performed over a long term with a toner including a resin having a PET structure and a black pigment.

Further features of the present invention will become apparent from the following description of exemplary embodiments.

DESCRIPTION OF THE EMBODIMENTS

Below, the present disclosure will be described in further details by way of embodiments thereof. However, the present disclosure is not limited thereto. Incidentally, the wording "from XX to YY" or "XX to YY" indicative of the numerical value range means the numerical value range including the lower limit and the upper limit of the end points unless otherwise specified. When the numerical value ranges are described in stages, the upper limits and the lower limits of respective numerical value ranges can be combined arbitrarily.

The present disclosure relates to a toner comprising:

a toner particle comprising a pigment;

a resin particle; and an external additive, wherein a brightness average value on the basis of a monochrome 256 gradation of the resin particle is 90 to 120, and an average circle-equivalent diameter of the resin particle is 0.5 to 3.0 μm, a brightness average value on the basis of a monochrome 256 gradation of the toner particle is 40 to 80, the pigment is a black pigment, a number of the resin particle in the toner is 5 to 40 for every 100 toner particles, the toner particle comprises at a surface thereof a resin having a repeating structure of a structure expressed by formula (1) below, the resin particle comprises at a surface thereof a resin having a repeating structure of a structure expressed by formula (1) below, and in a load displacement curve obtained by micro compression measurement of the resin particle, 90 number % or more of the resin particle does not have a fracture point at a load within a range 0 to 10 mN.

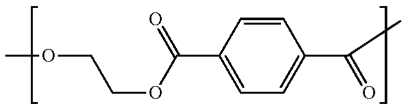

(1)

In the present disclosure, the toner particle has a resin having a repeating structure of the structure expressed by the formula (1) at the surface. Further, the toner has a resin particle having a brightness average value of 90 to 120 and an average circle-equivalent diameter of 0.5 to 3.0 μm, and having the repeating structure of the structure expressed by the formula (1). Such a toner can provide a toner having excellent durability even in a high-speed process, and having favorable cleaning performance through long-term printing. The present inventors think as follows as the mechanism which can provide such effects.

In order to suppress the slippage of a toner or an external additive at a cleaning blade, it is effective to keep the deposition layer (which will be hereinafter also referred to as a blocking layer) of an external additive formed at the contact region between the latent image bearing member surface and the cleaning blade (which will be hereinafter also referred to as a cleaning blade nip part) from collapsing.

The material for forming the blocking layer includes the external additive supplied from the toner as the main component. Constant supply of the external additive from the toner during printing keeps the stable blocking layer. However, when the blocking layer is collapsed or a gap is formed due to some factor or other, the supplied external additive or toner slips through the cleaning blade nip part, and is deposited on the charging roller (which will be hereinafter also referred to as a C roller). When the deposit is deposited on the C roller, and a change is caused in electric resistance of the surface, transfer of electric charges to the latent image bearing member ceases to be normally performed. This causes image defects such as streaks or non-uniformity.

The toner including a PET resin as a binder resin is strong in resistance to surface deterioration or the like, and is strong in durability against a change in surface property due to continuous printing. However, as described above, PET tends to become hard. For this reason, a definite interface tends to be formed between the pigment, particularly, carbon black dispersed in the inside thereof and PET. When a force is applied at the time of printing, the toner particle may be fractured with the interface as the starting point. The fractured toner particle become an irregular-shape particle with the inside thereof exposed.

Such a particle becomes strong in attachment force to the latent image bearing member, and hence enters the cleaning blade nip part without being transferred after development. The irregular-shape particle strong in attachment force to the latent image bearing member cannot be recovered with ease, and attacks the blocking layer of the cleaning blade nip part. As a result, the blocking layer is not kept stably, so that a gap or collapse is generated, which causes the toner or the external additive to slip from the portion. It is considered that the slipped substances are accumulated on the C roller, resulting in generation of image defects such as streaks or non-uniformity.

The present inventors found the following. By using a toner particle having a resin particle having a repeating structure of the structure expressed by the formula (1) and a resin particle having a brightness average value on the basis of monochrome 256 gradation of 90 to 120, and an average circle-equivalent diameter of 0.5 to 3.0 μm, and having a repeating structure of the structure expressed by the formula (1), it is possible to suppress the bad effect.

The resin particle has a repeating structure of the structure expressed by the formula (1), and the toner particle also has a repeating structure of the structure expressed by the formula (1). Namely, the resin particle has the composition similar to that of the toner particle surface. For this reason, the charging characteristics are the same performances as those of the toner particle. Therefore, when a toner is developed, the resin particle is also developed to the latent image bearing member in the same manner. However, the developed resin particle has a small particle diameter, and hence has a high attachment force to the latent image bearing member, and accordingly, is left without being transferred, to be supplied to the cleaning blade nip part with efficiency. The resin particle supplied to the cleaning blade nip part has a smaller particle diameter than that of the toner.

Generally, the van der Waals force and the electrostatic attachment force become stronger with a decrease in particle diameter. For this reason, the attachment force between the resin particle and the latent image bearing member becomes strong. For this reason, the resin particle is fed before the toner particle, is situated before the blocking layer, and is retained there. The resin particle retained before the blocking layer becomes a protective layer, and entry of the fractured toner particle involved in fracture of the blocking layer into the blocking layer is prevented in front thereof. As a result, conceivably, it is possible to keep the stable keeping of the blocking layer and the favorable cleaning performance. As a result, conceivably, image defects such as streaks or image density non-uniformity can be suppressed.

The brightness and the circle-equivalent diameter of the toner, and the number of the resin particle are the values obtainable by measurement under the analysis conditions described later using a flow particle image analyzer "FPIA-3000" (manufactured by SYSMEX Co.), and is the indicator indicative of the degree of scattering of a light of the toner. Generally, inclusion of a colorant results in a decrease in brightness of the toner.

The brightness average value on the basis of the monochrome 256 gradation of the toner particle is 40 to 80, which means that a black pigment is sufficiently present in the toner particle. The brightness average value of the toner particle is preferably 40 to 75, and more preferably 50 to 70.

In contrast, the brightness average value on the basis of the monochrome 256 gradation of the resin particle is 90 to 120. A brightness average value of 90 or more means a small content of a black pigment present in the resin particle. The brightness average value of the resin particle is preferably 95 to 120, and more preferably 100 to 115. The brightness average value can be controlled by the amount of the pigment, or the like.

Long retention before the blocking layer results in accumulation of the force to be applied to each resin particle. For this reason, the resin particle will tend to be fractured. However, the resin particle is a nearly transparent particle with a brightness average value within the range of 90 to 120. For this reason, other components dispersed in the inside thereof are scarcely present, and interfaces are also scarcely present in the particle inside. For this reason, the resin particle is less likely to be fractured, and 90 number % or more of resin particles of the resin particles do not have fracture points at a load within the range of 0 to 10 mN in a load displacement curve obtainable by the measurement and the analysis described later.

Herein, the fracture point of the toner particle or the resin particle is defined as follows. Herein, the toner particle or the resin particle is described merely as the particle.

Fracture point: of the local maximum points in the load displacement curve at micro compression measurement of the particle, the point at which the load amount at the local maximum point is minimum is defined as the fracture point.

Local Maximum point: in the load displacement curve of the displacement amount D and the load P, the point at which the particle starts to be deformed (in the measurement point group in which a monotone increase is observed continuously over a displacement of at least 0.3 μm, the first point of the first measurement point group) is assumed to be a starting point. Then, at the measurement points after the starting point, the point at which the ratio of the amounts of change in the load P to the displacement amount D (dP/dD) is 0 is assumed to be a point A. When the dP/dD is positive over a displacement of at least 0.1 μm until just before the point A, and the dP/dD is negative over a displacement of at least 0.1 μm from just after the point A, the point is assumed to be a local maximum point.

In order to set the ratio of the resin particle not having a fracture point at a load within the range of 0 to 10 mN at 90 number % or more, mention may be made of, for example, the means for reducing the amount of other components than the resin in the inside of the resin particle, such as satisfying of the brightness range. Alternatively, setting thereof can also be controlled by the resin composition, in other words, the monomer configuration, and becomes more likely to be attained by incorporating the structure expressed by the formula (1) into the resin composition.

The resin particle being less likely to be fractured suppresses the resin particle itself from becoming an irregular-shape particle that attacks the blocking layer, and makes it easier for the resin particle to become the protective layer for protecting the blocking layer. The average circle-equivalent diameter of the resin particle is 3.0 μm or less. As a result, the resin particle is situated closer to the blocking layer side than the toner particle, to form the protective layer, and enhances keeping of the blocking layer and the cleaning performance. Further, the average circle-equivalent diameter of the resin particle is 0.5 μm or more. As a result, it is possible to suppress entry of the resin particle into the blocking layer for integration.

The average circle-equivalent diameter of the resin particle is preferably 0.8 to 2.2 μm, and more preferably 1.0 to 2.0 μm.

Further, the number (content) of the resin particles in the toner is 5 to 40 for every 100 toner particles. The number of the resin particles is 5 or more. As a result, it is possible to form a protective layer for preventing entry of the irregular-shape particle before the blocking layer at the cleaning nip part, so that, conceivably a favorable cleaning performance can be kept. As a result, conceivably, it is possible to suppress generation of image defects such as streaks or the image density non-uniformity. On the other hand, a number of the resin particles of 40 or less can prevent the reduction of the image density.

The number of the resin particles in the toner is preferably 7 to 30, and more preferably 12 to 18 for every 100 toner particles.

The toner particle has a resin having a repeating structure of the structure expressed by the following formula (1) at the surface. Further, the resin particle has a resin having a repeating structure of the structure expressed by the following formula (1) at the surface. The repeating structure of the structure expressed by the formula (1) is, for example, a polyethylene terephthalate structure (a PET structure). Namely, the toner particle and the resin particle preferably have a resin having a PET structure at the surface. The structure expressed by the formula (1) is formed by, for example, condensation between ethylene glycol and terephthalic acid.

(1)

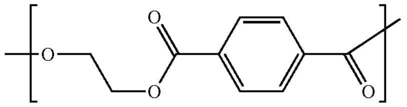

As an example of a toner particle and a resin particle having a resin having a repeating structure of the structure expressed by the formula (1) at the surface, mention may be made of a toner particle and a resin particle having a polyester resin, i.e., a condensation polymer of a monomer mixture including ethylene glycol and terephthalic acid at the surface. More specifically, a toner particle and a resin particle preferably includes a polyester resin having a PET structure including ethylene glycol and terephthalic acid.

As the PET-containing polyester resin, ethylene glycol and terephthalic acid may be used as monomers at the time of resin synthesis, or a recycled PET oligomer generated by recycle may be used.

For the monomer mixture, as other monomers than ethylene glycol and terephthalic acid, for example, carboxylic acid components and alcohol components mentioned below are preferably used.

As the carboxylic acid components, mention may be made of terephthalic acid, isophthalic acid, phthalic acid, fumaric acid, maleic acid, cyclohexanedicarboxylic acid, and trimellitic acid, and the like.

As the alcohol components, mention may be made of bisphenol A, hydrogenated bisphenol, an ethylene oxide adduct of bisphenol A, a propylene oxide adduct of bisphenol A, glycerin, trimethylolpropane, and pentaerythritol, and the like.

As the acid monomer components preferably used out of these, mention may be made of terephthalic acid, isophthalic acid, succinic acid, adipic acid, fumaric acid, trimellitic acid, and the like. Terephthalic acid, isophthalic acid, and trimellitic acid are more preferable. Further, as the alcohol components preferably used out of these, mention may be made of an ethylene oxide adduct of bisphenol A (e.g., a 1- to 5-mol adduct), a propylene oxide adduct of bisphenol A (e.g., a 1- to 5-mol adduct), and the like.

The content ratio of ethylene glycol of the monomer mixture is preferably 3 to 30 mass %, and more preferably 5 to 20 mass %. Further, the content ratio of terephthalic acid of the monomer mixture is preferably 20 to 45 mass %, and more preferably 20 to 30 mass %. The content ratio of an alkylene oxide adduct of bisphenol A (e.g., propylene oxide or ethylene oxide 1- to 5-mol adduct) of the monomer mixture is preferably 30 to 65 mass %, and more preferably 40 to 60 mass %.

Of the resin components included in the toner particle and the resin particle, the content of a polyester resin is preferably 50 to 100 mass %, more preferably 80 to 100 mass %, and further preferably 90 to 100 mass %.

For the resin particle, the m/z341 normalization intensity calculated by the following equation (A) with time of flight secondary ion mass spectrometry under the following conditions (2) is preferably $2.50\times10^{-4}$ to $1.00\times10^{-2}$.

$$m/z341 = \text{normalization intensity} = (\text{ion strength of the peak detected } m/z = 341)/(\text{total ion strength with } m/z = 0.5 \text{ to } 1850) \quad (A)$$

Further, for the resin particle, the m/z341 normalization intensity calculated by the equation (A) with time of flight secondary ion mass spectrometry under the following conditions (3) is preferably $2.50\times10^{-4}$ to $1.00\times10^{-2}$ Conditions (2): primary ion species: $Bi^{3++}$, acceleration voltage: 30 kV, measurement mode: Positive, Negative, measurement range: m/z=0.5 to 1850, raster size: 300×300 μm/256×256 pixel, measurement time: 180 seconds Conditions (3): a sputtering treatment is performed with Ar-GCIB under the following conditions, and then measurement is performed under the foregoing conditions (2) Ar-GCIB conditions acceleration voltage: 5 kV
current: 6.5 nA
raster size: 600×600 km
irradiation time: 5 sec/cycle
sputtering time: 500 seconds The peak detected with m/z=341 under the conditions (2) in analysis by time of flight secondary ion mass spectrometer derives from the structure including 3 monomers of terephthalic acid-ethylene glycol-terephthalic acid connected to one another. Detection of the peak indicates that the resin includes a PET resin structure. The m/z341 normalization intensity being $2.50\times10^{-4}$ to $1.00\times10^{-2}$ more stabilizes the charging characteristics due to inclusion of the PET resin, and makes it easy for the resin particle to have the charging characteristics similar to those of the toner particle. The m/z341 normalization intensity under the conditions (2) is preferably 0.0015 to 0.0035, and more preferably 0.0020 to 0.0030.

The m/z341 normalization intensity under the conditions (2) can be increased by increasing the content of terephthalic acid and ethylene glycol in the resin composition. Further, the m/z341 normalization intensity under the conditions (2) can be reduced by reducing the content of terephthalic acid and ethylene glycol in the resin composition.

Further, analysis under the conditions (3) can confirm that the PET resin structure is included not only on the surface but also into the inside thereof. The m/z341 normalization intensity under the conditions (3) is $2.50\times10^{-4}$ to $1.00\times10^{-2}$. As a result, the resin particle has a hardness enough to highly play a role of protecting the blocking layer without fracture at the cleaning nip part through the durability test. The m/z341 normalization intensity under the conditions (3) is preferably 0.0010 to 0.0030, and more preferably 0.0015 to 0.0025.

The m/z341 normalization intensity under the conditions (3) can be increased by configuring from the surface to the inside thereof with the same resin. Further, the m/z341 normalization intensity under the conditions (3) can be reduced by forming an inclined structure such that a resin with a lower polarity than that of the PET-containing resin of the surface is arranged in the inside thereof or a core-shell structure.

The content ratio of the resin particles in fine particles is preferably 60 to 100 number %, and more preferably 65 to 80 number %, where the fine particle represents a particle with a circle-equivalent diameter of 0.5 to 3.0 μm included in the toner.

The fine particles include, in addition to the resin particle having the specified brightness average value, or the like, a toner particle with a small particle diameter. Such a fine toner particle may include a pigment. A resin fine particle such as a toner particle including a pigment becomes more likely to be fractured with the interface with the pigment as the starting point. The resin fine particle including a pigment is also situated at the same place as that of the resin particle at the cleaning nip part because of the level of the attachment force derived from the particle diameter, and tends to be fractured. For this reason, an irregular-shape fine particle may be generated. When the resin particles are present is in an amount of 60 number % or more, it is possible to suppress the resin particles to be fractured at the cleaning nip part, so that the cleaning performance can be more favorably kept.

Further, the toner preferably includes fine particles in an amount of 10 to 40 number %, and more preferably includes fine particles in an amount of 10 to 20 number % based on the total amount of the toner particles and the resin particles (also including the fine particle).

The content being 10 number % or more enables the resin particles playing a role of protecting the blocking layer at the cleaning nip part to be included in a sufficient amount. On the other hand, the content being 40 number % or less more facilitates suppression of the reduction of the image density.

The amount of the fine particles described up to this point can be controlled by setting of the conditions at the classification step of the toner and the amount of the resin particles to be added at the external addition step.

The toner particle may include a binder resin. The binder resin preferably includes a polyester resin, and more preferably includes a polyester resin having a PET structure as a resin having a repeating structure of the structure expressed by the following formula (1). Further, the resin particle preferably includes a polyester resin. As the resin to be used for a binder resin or a resin particle, there is no particular restriction other than a polyester resin, and the following known resins can be used in combination.

Specifically, styrene type copolymers such as polystyrene, a styrene-propylene copolymer, a styrene-vinyl toluene copolymer, a styrene-methyl acrylate copolymer, a styrene-ethyl acrylate copolymer, a styrene-butyl acrylate copolymer, a styrene-octyl acrylate copolymer, a styrene-methyl methacrylate copolymer, a styrene-ethyl methacrylate copolymer, a styrene-butyl methacrylate copolymer, a styrene-octyl methacrylate copolymer, a styrene-butadiene copolymer, a styrene-isoprene copolymer, a styrene-maleic acid copolymer, and a styrene-maleic acid ester copolymer, polyacrylic acid ester, polymethacrylic acid ester, vinyl polyacetate, and the like can be used, and a plurality of these can be used in combination.

A binder resin includes a polyester resin, and preferably includes the structure corresponding to ethylene glycol as a component configuring a polyester resin in an amount of 3 to 30 mass % (more preferably in an amount of 5 to 20 mass %), and preferably includes the structure corresponding to terephthalic acid in an amount of 20 to 45 mass % (more preferably in an amount of 20 to 30 mass %). Inclusion of ethylene glycol in an amount of 3 mass % or more, and terephthalic acid in an amount of 20 mass % or more enables stable keeping of electric charges, and enables suppression of the deformation of a toner particle and deterioration of the surface due to continuous printing. Further, by setting the amount of ethylene glycol at 30 mass % or less, and the amount of terephthalic acid at 45 mass % or less, it is possible to suppress the effect by the humidity, and to keep the environmental stability at a higher level.

Further, in the load displacement curve obtainable by the micro compression measurement of a toner particle, 80 number % or more of the toner particles each preferably have a fracture point at a load within the range of 0 mN to 10 mN. When a toner particle has the foregoing PET structure, the fracture point becomes more likely to be generated. For this reason, it is considered that 80 number % or more of toner particles each having a fracture point indicates a large number of toner particles each having the PET structure. For this reason, the charging characteristics become more uniform, and the electrophotographic characteristic becomes more stable.

The means for allowing a resin particle to be present in a toner has no particular restriction.

For example, when a toner particle is manufactured by the pulverization method, the suspension polymerization method, or the emulsion aggregation method, mixing in a toner particle before the external addition step enables a resin particle to be present in the toner.

Further, with the suspension polymerization method, for example, the following is possible: by increasing the suspending rotation speed at the time of suspension, or other procedures, a small particle not including a pigment is generated, and a resin particle is formed. Whereas, with the emulsion aggregation method, for example, the following is possible: by using a rein with a high acid value at the time of suspension, or other procedures, a small particle not including a pigment is generated, and a resin particle is formed.

Further, for the toner particle manufactured with any method, the following is also acceptable: after manufacturing and drying the toner particle, using the same device as that for external addition, the toner particle and a resin particle are mixed, so that the resin particle is allowed to be present in the toner. For external addition, the toner particle, the resin particle, and an external additive may be mixed.

When a toner is subjected to an elution treatment under the following elution conditions A, a compound A and a compound B to be eluted in methanol are preferably included.

Elution conditions A: using methanol (JISK8891 standard equivalent product) in an amount of 10 times based on the mass of the toner at 25 °C, stirring is performed at a rotation speed of a rotor of 200 rpm for 10 hours by a stirrer.

Further, preferably, when the supernatant obtained by centrifuging the effluent obtained by elution of the compound A and the compound B into methanol under the following centrifugation conditions A is analyzed by a liquid chromatograph ESI/MS under the following analysis conditions A, the compound A included in the supernatant is detected as having been ionized to be a cation, and the compound B included in the supernatant is detected as an anion.

centrifugation conditions A: rotation is performed at 25 °C with a rotation radius of 10.1 cm, and a rotation speed of 3500 rpm for 30 minutes.

analysis conditions A: the one resulting from ionization under the conditions of capillary voltage: 35 V, tube lens voltage: 110 V under the conditions of Sheath Gas: 10 (arb. unit), Aux Gas: 5 (arb. unit), spray voltage: 5 kV, capillary temperature: 275 °C is detected as a cation, and the one resulting from ionization under the conditions of capillary voltage: −35 V and tube lens voltage: −110 V is detected as an anion.

The compound A and the compound B that can be extracted by methanol, to be ionized are components with a high polarity present in the vicinity of the surface, and play a role of assisting the charging characteristics of the toner. Analysis with ESI/MS detects the compound A on the cation side, and the compound B on the anion side. This indicates that there are the one which tends to become positive and the one which tends to become negative as the charging characteristics.

Inclusion of the compound A and the compound B in the toner results in the presence of both of the positive component and the negative component. For this reason, the toner has features of tending to be negatively charged by the negative component and tending to leak by the negative component. The structure expressed by the formula (1) has a high polarity and tends to be charged. The presence of the compound A and the compound B having a role of assisting the charging characteristics in the vicinity of the surface stabilizes negative charging retention, and prevents overcharging of the toner due to leakage by the positive component.

By preventing the overcharging of the toner, it is possible to reduce the attachment force. For this reason, the untransferred toner to be supplied to the cleaning nip can be reduced, so that the cleaning performance can be kept more favorably.

In order to allow the compound A to be included in the toner, a material that is not bound with the binder resin of the toner, and is present independently is preferably used. For example, a surfactant having a repeating structure of ethylene oxide can be used.

Preferably, the compound A includes at least one compound selected from the group consisting of polyoxyethylene lauryl ether, polyoxyethylene hexadecyl ether, polyoxyethylene nonylphenyl ether, polyoxyethylene dodecyl ether, polyoxyethylene sorbitan monooleate ether, polyoxyethylene styrylphenyl ether, sodium polyoxyethylene (2) lauryl ether sulfate, sodium polyoxyethylene lauryl ether acetate, and the like.

The compound A is preferably at least one compound selected from the group consisting of ethylene oxide adducts of straight chain aliphatic alcohol having 8 to 16 (more preferably 10 to 14) carbon atoms, and sodium polyoxyethylene lauryl ether acetate, and more preferably an ethylene oxide adduct of lauryl alcohol.

The addition method has no particular restriction. For example, when a toner is manufactured with the emulsion aggregation method, mention may be made of the method in which the compound A is added at any step of manufacturing a colorant-dispersed solution, a release agent-dispersed solution, a resin particle-dispersed solution, or the like, or the step of cleaning a toner. The compound A is preferably added for manufacturing each dispersed solution such as a colorant-dispersed solution, a release agent-dispersed solution, or a resin particle-dispersed solution. Further, the compound A is preferably added to a mixed solution for manufacturing the aggregated particles (i.e., at the dispersing step).

In order to allow the compound B to be included in a toner, a material that is not bound with the binder resin of the toner, and is present independently is preferably used. For example, an anionic surfactant can be preferably used. Preferably, as the compound B, mention may be made of at least one compound selected from the group consisting of an aliphatic soap such as sodium stearate or sodium laurate, sodium lauryl sulfate, (linear chain type or branch type) sodium dodecyl benzenesulfonate, sodium polyoxyethylene (2) lauryl ether sulfate, and the like. The compound B is preferably linear chain type or branch type sodium dodecyl benzenesulfonate.

The addition method has no particular restriction. For example, when a toner is manufactured with the emulsion aggregation method, mention may be made of the method in which the foregoing compound is added at any step of manufacturing a colorant-dispersed solution, a release agent-dispersed solution, a resin particle-dispersed solution, or the like, or the step of cleaning the toner. The compound B is preferably added for manufacturing each dispersed solution such as a colorant-dispersed solution, a release agent-dispersed solution, or a resin particle-dispersed solution. Further, the compound B is preferably added to a mixed solution for manufacturing the aggregated particles (i.e., at the dispersing step).

The method for manufacturing a toner has no particular restriction. Any method of the suspension polymerization method, the dissolution suspension method, the emulsion aggregation method, the pulverization method, and the like may be used. Particularly, the manufacturing method using the emulsion aggregation method is preferably used. Namely, the toner particle is preferably an emulsion aggregation toner particle. This is preferable from the viewpoint of the manufacturing ease including general use of a surfactant in the process of toner formation.

As described previously, in manufacturing of a toner with the emulsion aggregation method, a component to be included can be made into a toner by being mixed as an emulsified particle for aggregation. For this reason, a necessary component tends to be introduced, which facilitates design and manufacturing of a high-performance toner. However, emulsified particles are aggregated to form particles. For this reason, the shapes of the original emulsified particles may be left on the surface or in the inside thereof. In such a case, with the site as the starting point, the toner particle tends to be fractured. For this reason, the effects are more likely to be produced due to the improvement of the performance of cleaning by the present disclosure.

Methods for producing components that constitute the toner and a method for producing the toner will now be explained in greater detail.

Binder Resin

The toner particle may contain a binder resin.

For the binder resin, the following resins and polymers can be given as examples of polyester resins, vinyl-based resins, and other binder resins. Examples thereof include styrene acrylic resins, polyester resins, epoxy resins, polyurethane resins, polyamide resins, cellulose resins, polyether resins, and mixed resins and complex resins of these.

From the perspectives of being inexpensive and easy to procure and exhibiting excellent low-temperature fixability, the binder resin is preferably a polyester resin, a styrene acrylic resin or a hybrid resin of these, and is more preferably a polyester resin.

A polyester resin can be obtained by selecting preferable ones from a polyhydric carboxylic acid, polyol, hydroxycarboxylic acid, and the like, and combining them, and synthesizing them using, for example, a conventionally known method such as the transesterification method or the polycondensation method.

For example, for the monomer mixture, the following polyhydric carboxylic acids and polyol may be used.

A polycarboxylic acid is a compound having 2 or more carboxyl groups per molecule. Of these, a dicarboxylic acid is a compound having 2 carboxyl groups per molecule, and is preferably used.

Examples of dicarboxylic acids include oxalic acid, succinic acid, glutaric acid, maleic acid, adipic acid, β-methyladipic acid, azelaic acid, sebacic acid, nonanedicarboxylic acid, decanedicarboxylic acid, undecanedicarboxylic acid, dodecanedicarboxylic acid, fumaric acid, citraconic acid, diglycolic acid, cyclohexane-3,5-diene-1,2-carboxylic acid, hexahydroterephthalic acid, malonic acid, pimelic acid, suberic acid, phthalic acid, isophthalic acid, terephthalic acid, tetrachlorophthalic acid, chlorophthalic acid, nitrophthalic acid, p-carboxyphenylacetic acid, p-phenylenediacetic acid, m-phenylenediacetic acid, o-phenylenediacetic acid, diphenylacetic acid, diphenyl-p,p'-dicarboxylic acid, naphthalene-1,4-dicarboxylic acid, naphthalene-1,5-dicarboxylic acid, naphthalene-2,6-dicarboxylic acid, anthracenedicarboxylic acid and cyclohexanedicarboxylic acid.

Examples of polycarboxylic acids other than the dicarboxylic acids mentioned above include trimellitic acid, trimesic acid, pyromellitic acid, naphthalenetricarboxylic acid, naphthalenetetracarboxylic acid, pyrenetricarboxylic acid, pyrenetetracarboxylic acid, itaconic acid, glutaconic acid, n-dodecylsuccinic acid, n-dodecenylsuccinic acid, isododecylsuccinic acid, isododecenylsuccinic acid, n-octylsuccinic acid and n-octenylsuccinic acid. It is possible to use one of these polycarboxylic acids in isolation or a combination of two or more types thereof.

A polyol is a compound having 2 or more hydroxyl groups per molecule. Of these, a diol is a compound having 2 hydroxyl groups per molecule, and is preferably used.

Specific examples include ethylene glycol, diethylene glycol, triethylene glycol, 1,2-propylene glycol, 1,3-propylene glycol, 1,4-butane diol, 1,5-pentane diol, 1,6-hexane diol, 1,7-heptane diol, 1,8-octane diol, 1,9-nonane diol, 1,10-decane diol, 1,11-undecane diol, 1,12-dodecane diol, 1,13-tridecane diol, 1,14-tetradecane diol, 1,18-octadecane diol, 1,14-eicosane diol, dipropylene glycol, polyethylene glycol, polypropylene glycol, polytetramethylene ether glycol, 1,4-cyclohexane diol, 1,4-cyclohexane dimethanol, 1,4-butene diol, neopentyl glycol, 1,4-cyclohexane diol, polytetramethylene glycol, hydrogenated bisphenol A, bisphenol A, bisphenol F, bisphenol S, and alkylene oxide (ethylene oxide, propylene oxide, butylene oxide and the like) adducts of these bisphenol compounds.

Out of these, preferable are terephthalic acid, isophthalic acid, trimellitic acid, an ethylene oxide adduct of bisphenol A (e.g., 1- to 5-mol adduct), and a propylene oxide adduct of bisphenol A (e.g., 1- to 5-mol adduct).

Examples of trihydric or higher polyols include glycerin, trimethylolethane, trimethylolpropane, pentaerythritol, hexamethylolmelamine, hexaethylolmelamine, tetramethylolbenzoguanamine, tetraethylolbenzoguanamine, sorbitol, trisphenol PA, phenol novolac, cresol novolac and alkylene oxide adducts of the trihydric or higher polyphenol compounds listed above. It is possible to use one of these trihydric or higher polyols in isolation or a combination of two or more types thereof. In addition, the polyester resin may be a urea group-containing polyester resin. The polyester resin is preferably one in which a carboxyl group at a terminal or the like is not capped.

Examples of styrene acrylic resins include homopolymers comprising polymerizable monomers listed below, copolymers obtained by combining two or more of these polymerizable monomers, and mixtures of these.

Styrene-based monomers such as styrene, α-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene and p-phenylstyrene; (meth)acrylic monomers such as methyl (meth)acrylate, ethyl (meth)acrylate, n-propyl (meth)acrylate, iso-propyl (meth)acrylate, n-butyl (meth)acrylate, iso-butyl (meth)acrylate, tert-butyl (meth)acrylate, n-amyl (meth)acrylate, n-hexyl (meth)acrylate, 2-ethylhexyl (meth)acrylate, n-octyl (meth)acrylate, n-nonyl (meth)acrylate, cyclohexyl (meth)acrylate, benzyl (meth)acrylate, dimethyl phosphate ethyl (meth)acrylate, diethyl phosphate ethyl (meth)acrylate, dibutyl phosphate ethyl (meth)acrylate, 2-benzoyloxyethyl (meth)acrylate, (meth)acrylonitrile, 2-hydroxyethyl (meth)acrylate, (meth) acrylic acid and maleic acid;

Vinyl ether-based monomers such as vinyl methyl ether and vinyl isobutyl ether; and vinyl ketone-based monomers such as vinyl methyl ketone, vinyl ethyl ketone and vinyl isopropenyl ketone;

Polyolefins of ethylene, propylene, butadiene, and the like.

The styrene acrylic resin can be obtained using a polyfunctional polymerizable monomer if necessary. Examples of polyfunctional polymerizable monomers include diethylene glycol di(meth)acrylate, triethylene glycol di(meth)acrylate, tetraethylene glycol di(meth)acrylate, polyethylene glycol di(meth)acrylate, 1,6-hexane diol di(meth)acrylate, neopentyl glycol di(meth)acrylate, tripropylene glycol di(meth)acrylate, polypropylene glycol di(meth)acrylate, 2,2'-bis(4-((meth)acryloxydiethoxy)phenyl)propane, trimethylolpropane tri(meth)acrylate, tetramethylolpropane tetra(meth)acrylate, divinylbenzene, divinylnaphthalene and divinyl ether.

In addition, it is possible to further add well-known chain transfer agents and polymerization inhibitors in order to control the degree of polymerization.

Examples of polymerization initiators used for obtaining the styrene acrylic resin include organic peroxide-based initiators and azo-based polymerization initiators.

Examples of organic peroxide-based initiators include benzoyl peroxide, lauroyl peroxide, di-α-cumyl peroxide, 2,5-dimethyl-2,5-bis(benzoyl peroxy)hexane, bis(4-t-butylcyclohexyl) peroxydicarbonate, 1,1-bis(t-butyl peroxy)cyclododecane, t-butyl peroxymaleic acid, bis(t-butyl peroxy) isophthalate, methyl ethyl ketone peroxide, tert-butyl peroxy-2-ethylhexanoate, diisopropyl peroxycarbonate, cumene hydroperoxide, 2,4-dichlorobenzoyl peroxide and tert-butyl-peroxypivalate.

Examples of azo type initiators include 2,2'-azobis(2,4-dimethylvaleronitrile), 2,2'-azobisisobutyronitrile, 1,1'-azobis(cyclohexane-1-carbontrile), 2,2'-azobis-4-methoxy-2,4-dimethylvaleronitrile, azobis(methylbutyronitrile) and 2,2'-azobis-(methylisobutyrate).

In addition, a redox type initiator obtained by combining an oxidizing substance with a reducing substance can be used as a polymerization initiator.

Examples of oxidizing substances include inorganic peroxides such as hydrogen peroxide and persulfates (sodium salts, potassium salts and ammonium salts), and oxidizing metal salts such as tetravalent cerium salts.

Examples of reducing substances include reducing metal salts (divalent iron salts, monovalent copper salts and trivalent chromium salts), ammonia, amino compounds such as lower amines (amines having from 1 to 6 carbon atoms, such as methylamine and ethylamine) and hydroxylamine, reducing sulfur compounds such as sodium thiosulfate, sodium hydrosulfite, sodium hydrogen sulfite, sodium sulfite and aldehyde sulfoxylates, lower alcohols (having from 1 to 6 carbon atoms), ascorbic acid and salts thereof, and lower aldehydes (having from 1 to 6 carbon atoms).

The polymerization initiator is selected with reference to 10-hour half-life decomposition temperatures, and can be a single polymerization initiator or a mixture thereof. The added amount of polymerization initiator varies according to the target degree of polymerization, but is generally an amount of from 0.5 parts by mass to 20.0 parts by mass relative to 100.0 parts by mass of polymerizable monomer.

The binder resin may contain a crystalline polyester. Examples of the crystalline polyester include condensation polymerization products of aliphatic diols and aliphatic dicarboxylic acids.

The crystalline polyester resin is preferably a condensation polymerization product of an aliphatic diol having from 2 to 12 carbon atoms and an aliphatic dicarboxylic acid having from 2 to 12 carbon atoms as primary components. Examples of aliphatic diols having from 2 to 12 carbon atoms include the compounds listed below. 1,2-ethane diol, 1,3-propane diol, 1,4-butane diol, 1,5-pentane diol, 1,6-hexane diol, 1,7-heptane diol, 1,8-octane diol, 1,9-nonane diol, 1,10-decane diol, 1,11-undecane diol, 1,12-dodecane diol, and the like.

In addition, an aliphatic diol having a double bond can be used. Examples of aliphatic diols having a double bond include the compounds listed below. 2-butene-1,4-diol, 3-hexene-1,6-diol and 4-octene-1,8-diol.

Examples of aliphatic dicarboxylic acids having from 2 to 12 carbon atoms include the compounds listed below. Oxalic acid, malonic acid, succinic acid, glutaric acid, adipic acid, pimelic acid, suberic acid, azelaic acid, sebacic acid, 1,9-nonanedicarboxylic acid, 1,10-decanedicarboxylic acid, 1,11-undecanedicarboxylic acid, 1,12-dodecanedicarboxylic acid, and lower alkyl esters and acid anhydrides of these aliphatic dicarboxylic acids.

Of these, sebacic acid, adipic acid, 1,10-decanedicarboxylic acid, and lower alkyl esters and acid anhydrides of these are preferred. It is possible to use one of these aliphatic polycarboxylic acids in isolation, or a mixture of two or more types thereof.

In addition, an aromatic dicarboxylic acid can be used. Examples of aromatic dicarboxylic acids include the compounds listed below. Terephthalic acid, isophthalic acid, 2,6-naphthalenedicarboxylic acid and 4,4'-biphenyldicarboxylic acid. Of these, terephthalic acid is preferred from perspectives such as ease of procurement and ease of forming a low melting point polymer.

In addition, a dicarboxylic acid having a double bond can be used. A dicarboxylic acid having a double bond can crosslink the entire resin by means of the double bond, and can be advantageously used in order to suppress hot offsetting at the time of fixing.

Examples of such dicarboxylic acids include fumaric acid, maleic acid, 3-hexene dioic acid and 3-octene dioic acid. In addition, lower alkyl esters and acid anhydrides of these can also be used. Of these, fumaric acid and maleic acid are more preferred.

The method for producing the crystalline polyester is not particularly limited, and it is possible to produce the crystalline polyester by means of an ordinary polyester polymerization method in which a dicarboxylic acid component is reacted with a diol component. For example, it is possible to use a direct polycondensation method or a transesterification method, and the crystalline polyester can be produced using either of these methods depending on the type of monomer used.

The content of the crystalline polyester is preferably from 1.0 parts by mass to 30.0 parts by mass, and more preferably from 3.0 parts by mass to 25.0 parts by mass, relative to 100 parts by mass of the binder resin.

The peak temperature of the maximum endothermic peak of the crystalline polyester, as measured using a differential scanning calorimeter (DSC), is preferably from 50.0 °C. to 100.0 °C, and is more preferably from 60.0 °C. to 90.0 °C. from the perspective of low-temperature fixability.

The molecular weight of the binder resin is such that the peak molecular weight Mp is preferably from 5000 to 100000, and more preferably from 10000 to 40000. The glass transition temperature Tg of the binder resin is preferably from 40 °C. to 70 °C.

Crosslinking Agent

To control the molecular weight of the binder resin constituting the toner particle, a crosslinking agent may also be added during polymerization of the polymerizable monomers.

Examples include ethylene glycol dimethacrylate, ethylene glycol diacrylate, diethylene glycol dimethacrylate, diethylene glycol diacrylate, triethylene glycol dimethacrylate, triethylene glycol diacrylate, neopentyl glycol dimethacrylate, neopentyl glycol diacrylate, divinyl benzene, bis (4-acryloxypolyethoxyphenyl) propane, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, diacrylates of polyethylene glycol #200, #400 and #600, dipropylene glycol diacrylate, polypropylene glycol diacrylate, polyester diacrylate (MANDA, Nippon Kayaku Co., Ltd.), and these with methacrylate substituted for the acrylate.

The added amount of the crosslinking agent is preferably from 0.001 to 15.000 mass parts per 100 mass parts of the polymerizable monomers.

Release Agent

A well-known wax can be used as a release agent in the toner.

Specific examples thereof include petroleum-based waxes and derivatives thereof, such as paraffin waxes, microcrystalline waxes and petrolatum, montan wax and derivatives thereof, hydrocarbon waxes and derivatives thereof obtained using the Fischer Tropsch process, polyolefin waxes and derivatives thereof, such as polyethylene waxes and polypropylene waxes, and natural waxes and derivatives thereof, such as carnauba wax and candelilla wax. Derivatives include oxides, block copolymers formed with vinyl monomers, and graft-modified products.

Further examples include higher aliphatic alcohols; fatty acids, such as stearic acid and palmitic acid, and amides, esters and ketones of these acids; hydrogenated castor oil and derivatives thereof, plant waxes and animal waxes. It is possible to use one of these release agents in isolation, or a combination thereof.

Of these, use of a polyolefin, a hydrocarbon wax produced using the Fischer Tropsch process or a petroleum-based wax is preferred from the perspectives of developing performance and transferability being improved. Moreover, antioxidants may be added to these waxes as long as the characteristics of the toner are not adversely affected.

In addition, from the perspectives of phase separation from the binder resin and crystallization temperature, preferred examples include higher fatty acid esters such as behenyl behenate and dibehenyl sebacate. Also, ester waxes as plasticizers, described below, can also be used suitably.

The content of the release agent is preferably from 1.0 parts by mass to 30.0 parts by mass relative to 100.0 parts by mass of the binder resin.

The melting point of the release agent is preferably from 30 °C. to 120 °C, and more preferably from 60 °C. to 100 °C. By using a release agent having a melting point of from 30 °C. to 120 °C, a releasing effect is efficiently achieved and a broader fixing range is ensured.

Plasticizer

A crystalline plasticizer is preferably used in order to improve the sharp melt properties of the toner. The plasticizer is not particularly limited, and well-known plasticizers used in toners, such as those listed below, can be used.

Examples thereof include esters of monohydric alcohols and aliphatic carboxylic acids and esters of monohydric carboxylic acids and aliphatic alcohols, such as behenyl behenate, stearyl stearate and palmityl palmitate; esters of dihydric alcohols and aliphatic carboxylic acids and esters of dihydric carboxylic acids and aliphatic alcohols, such as ethylene glycol distearate, dibehenyl sebacate and hexane diol dibehenate; esters of trihydric alcohols and aliphatic carboxylic acids and esters of trihydric carboxylic acids and aliphatic alcohols, such as glycerin tribehenate; esters of tetrahydric alcohols and aliphatic carboxylic acids and esters of tetrahydric carboxylic acids and aliphatic alcohols, such as pentaerythritol tetrastearate and pentaerythritol tetrapalmitate; esters of hexahydric alcohols and aliphatic carboxylic acids and esters of hexahydric carboxylic acids and aliphatic alcohols, such as dipentaerythritol hexastearate and dipentaerythritol hexapalmitate; esters of polyhydric alcohols and aliphatic carboxylic acids and esters of polycarboxylic acids and aliphatic alcohols, such as polyglycerol behenate; and natural ester waxes such as carnauba wax and rice wax. It is possible to use one of these plasticizers in isolation, or a combination thereof.

Colorant

A toner particle has a pigment as a colorant. The pigment includes a black pigment. As the black pigment, typically, carbon black is used. The black pigment preferably includes carbon black. As described above, use of a black pigment such as carbon black facilitates the formation of a definite interface between the carbon black and the resin, so that fracture and chipping of the toner tend to be caused with the site as the starting point. In the present disclosure, even when such a toner is used, a favorable cleaning performance can be kept.

The pigment is preferably used in an amount of from 1.0 part by mass to 20.0 parts by mass, and is more preferably used in an amount of from 2.0 parts by mass to 10.0 parts by mass for every 100.0 parts by mass of a binder resin.

Charge Control Agent and Charge Control Resin

The toner particle may contain a charge control agent or a charge control resin. A well-known charge control agent can be used, and a charge control agent which has a fast triboelectric charging speed and can stably maintain a certain triboelectric charge quantity is particularly preferred. Furthermore, in a case where a toner particle is produced using a suspension polymerization method, a charge control agent which exhibits low polymerization inhibition properties and which is substantially insoluble in an aqueous medium is particularly preferred.

Examples of charge control agents that impart the toner particle with negative chargeability include monoazo metal compounds, acetylacetone metal compounds, aromatic oxycarboxylic acid, aromatic dicarboxylic acid, oxycarboxylic acid and dicarboxylic acid-based metal compounds, aromatic oxycarboxylic acids, aromatic mono- and poly-carboxylic acids and metal salts, anhydrides and esters thereof, phenol derivatives such as bisphenol, urea derivatives, metal-containing salicylic acid-based compounds, metal-containing naphthoic acid-based compounds, boron compounds, quaternary ammonium salts, calixarenes and charge control resins.

It is possible to use a polymer or copolymer having a sulfonic acid group, a sulfonic acid salt group or a sulfonic acid ester group as the charge control resin. It is particularly preferable for a polymer having a sulfonic acid group, a sulfonic acid salt group or a sulfonic acid ester group to contain a sulfonic acid group-containing acrylamide-based monomer or a sulfonic acid group-containing methacrylamide-based monomer at a copolymerization ratio of 2 mass % or more, and more preferably 5 mass % or more.

The charge control resin preferably has a glass transition temperature (Tg) of from 35 °C. to 90 °C, a peak molecular weight (Mp) of from 10000 to 30000, and a weight average molecular weight (Mw) of from 25000 to 50000. In a case where this is used, it is possible to impart preferred triboelectric charging characteristics without adversely affecting thermal characteristics required of the toner particle. Furthermore, if the charge control resin contains a sulfonic acid group, dispersibility of the charge control resin per se in the polymerizable monomer composition and dispersibility of the colorant and the like are improved, and tinting strength, transparency and triboelectric charging characteristics can be further improved.

It is possible to add one of these charge control agents or charge control resins in isolation, or a combination of two or more types thereof.

The added amount of the charge control agent or charge control resin is preferably from 0.01 parts by mass to 20.0 parts by mass, and more preferably from 0.5 parts by mass to 10.0 parts by mass, relative to 100.0 parts by mass of the binder resin.

Toner Particle Production Method

The toner particle preferably has a core particle that contains the binder resin and a shell on the surface of the core particle. The method for producing the toner particle is not particularly limited, and can be a well-known method, and it is possible to use a kneading pulverization method or a wet production method. A wet production method is preferred from the perspectives of particle diameter uniformity and shape control properties and readily obtaining a toner particle which has a core-shell structure. Examples of wet production methods include suspension polymerization methods, dissolution suspension methods, emulsion polymerizations and emulsion aggregation methods, and an emulsion aggregation method is more preferred from the perspective of facilitating shape control of the toner particle.

In an emulsion aggregation method, dispersed solutions of materials such as fine particles of the binder resin and the colorant are first prepared. If necessary, dispersion stabilizers are added to the obtained dispersed solutions of these materials, and dispersed and mixed. Next, a flocculant is added so as to aggregate the dispersed solutions to a desired toner particle diameter, and resin fine particles are fused to each other during or after the aggregation. Toner particles are then formed by carrying out shape control using heat if necessary.

Here, fine particles of the binder resin can form composite particles formed from a plurality of layers comprising two or more layers of resins having different compositions. For example, the toner particle can be produced using an emulsion polymerization method, a mini-emulsion polymerization method, a phase inversion emulsification method, or the like, or by combining several of these methods. In a case where the toner particle contains an internal additive, the internal additive may be contained in resin fine particles, or is possible to separately prepare an internal additive fine particle-dispersed solution comprising only the internal additive and then carry out aggregation when the internal additive fine particles are aggregated with the resin fine particles. In addition, it is possible to carry out aggregation by adding resin fine particles having different compositions at different times during aggregation, thereby producing a toner particle having a configuration in which layers have different compositions. It is possible to aggregate resin fine particles containing the binder resin so as to form a core part and then carry out aggregation by adding resin fine particles containing a shell-forming resin at different times so as to form a shell part.

A toner particle may have a shell. The resin for a shell may be the same resin as the binder resin, or may be a different resin. The amount of the resin for a shell to be added (the content of the shell) is preferably 1.0 to 10.0 parts by mass, and more preferably 2.0 to 7.0 parts by mass for every 100 parts by mass of the binder resin included in the core particle. For example, as the resin for a shell, a polyester resin having the repeating structure of the formula (1) may be used. The shell preferably has a polyester resin having the repeating structure of the formula (1).

In this case, the manufacturing method of a toner preferably has the following steps.

(1) a dispersing mixing step of preparing a binder resin fine particle-dispersed solution including a binder resin and a colorant fine particle-dispersed solution including a pigment, and mixing them, thereby obtaining a mixed dispersed solution, (2) an aggregating step of aggregating the binder resin fine particles and the colorant fine particles included in the resulting mixed dispersed solution, and forming an aggregate, (3) a shell forming step of further adding a resin fine particle including a resin for a shell in the dispersed solution including the aggregate for aggregation, and forming an aggregate having a shell, and (4) a fusing step of heating the aggregate for fusion.

The resulting fused particle is cooled. As a result, a toner particle can be obtained.

Further, the manufacturing method of a toner preferably has, during the step (4) or after the steps (1) to (4), the following step (5):

(5) a spheroidizing step of heating the aggregate by further raising the temperature.

Then, after the step (5), the manufacturing method of a toner may have the following steps (6) and (7).

(6) an annealing step of heating and holding the fused particle to a temperature equal to or higher than the crystallization temperature of the binder resin or equal to or higher than the glass transition temperature thereof, and (7) a cooling step of cooling the fused particle at a cooling rate of 0.1 °C./sec or higher, and obtaining a toner particle.

Substances listed below can be used as dispersion stabilizers.

Well-known cationic surfactants, anionic surfactants and non-ionic surfactants can be used as surfactants.

Examples of inorganic dispersion stabilizers include tricalcium phosphate, magnesium phosphate, zinc phosphate, aluminum phosphate, calcium carbonate, magnesium carbonate, calcium hydroxide, magnesium hydroxide, aluminum hydroxide, calcium metasilicate, calcium sulfate, barium sulfate, bentonite, silica and alumina. In addition, examples of organic dispersion stabilizers include poly (vinyl alcohol), gelatin, methyl cellulose, methylhydroxypropyl cellulose, ethyl cellulose, sodium carboxymethyl cellulose and starch.

In addition to surfactants having the opposite polarity from surfactants used in the dispersion stabilizers mentioned above, inorganic salts and divalent or higher inorganic metal salts can be advantageously used as flocculants. Inorganic metal salts are particularly preferred from the perspectives of facilitating control of aggregation properties and toner charging performance due to polyvalent metal elements being ionized in aqueous media.

Specific examples of preferred inorganic metal salts include metal salts such as calcium chloride, calcium nitrate, barium chloride, magnesium chloride, zinc chloride, iron chloride, aluminum chloride and aluminum sulfate; and inorganic metal salt polymers such as iron polychloride, aluminum polychloride, aluminum polyhydroxide and calcium polysulfide. Of these, aluminum salts and polymers thereof are particularly preferred. In order to attain a sharper particle size distribution, it is generally preferable for the valency of an inorganic metal salt to be divalent rather than monovalent and trivalent or higher rather than divalent, and an inorganic metal salt polymer is more suitable for a given valency.

From the viewpoint of high definition and high resolution of an image, the weight-average particle diameter (D4) of the toner particle is preferably from 3.0 μm to 10.0 μm, more preferably from 5.0 μm to 8.0 μm, and further preferably from 6.0 μm to 7.0 μm.

Manufacturing Method of Resin Particle

For the manufacturing method of a resin particle, the emulsion aggregation method is preferably used as with the toner particle. The binder resin particle-dispersed solution including a polyester resin, and if required, the colorant particle-dispersed solution are aggregated. As a result, a resin particle can be obtained. With the same means as that for manufacturing of a toner particle, the aggregation time may be controlled so as to obtain the average circle-equivalent diameter.

Manufacturing Method of Toner

If required, to the toner particle, external additives such as various organic or inorganic fine particles may be added. Examples of other external additives may include an inorganic oxide fine particle such as a silica fine particle, an alumina fine particle, or a titanium oxide fine particle, an inorganic stearic acid compound fine particle such as an aluminum stearate fine particle, or a zinc stearate fine particle, or an inorganic titanic acid compound fine particle such as strontium titanate or zinc titanate. These can be sued singly alone, or in combination with two or more thereof. The external additive preferably includes a silica fine particle.

The inorganic fine particle is preferably subjected to a gloss treatment by a silane coupling agent, a titanium coupling agent, higher fatty acid, silicone oil, or the like in order to improve the heat-resistant storage property, and to improve the environmental stability. The BET specific surface area of the external additive is preferably from 10 $m^2/g$ to 450 $m^2/g$.

The BET specific surface area can be determined with the low temperature adsorption method by the dynamic constant pressure method according to the BET method (preferably the BET multipoint method). For example, using a specific surface area measuring device (trade name: Gemini 2375 Ver. 5.0, manufactured by SHIMADZU CORPORATION), the sample surface is allowed to adsorb a nitrogen gas, and is measured using the BET multipoint method. As a result, the BET specific surface area ($m^2/g$) can be calculated.

The total content of the various external additives is preferably from 0.05 part by mass to 5 parts by mass, more preferably from 0.1 part by mass to 3 parts by mass, and further preferably from 1.0 part by mass to 2.0 parts by mass for every 100 parts by mass of the toner particle. Further, as the external additives, various ones may be combined for use.

The mixing machine used for externally adding the external additive to the toner particle is not particularly limited, and it is possible to use a well-known mixing machine regardless of whether this is a wet mixer or a dry mixer. Examples thereof include an FM mixer (available from Nippon Coke and Engineering Co., Ltd.), a super mixer (available from Kawata Co., Ltd.), a Nobilta (available from Hosokawa Micron Corp.) or a Hybridizer (available from Nara Machinery Co., Ltd.). It is possible to prepare the toner by adjusting the speed of rotation of the external addition apparatus, the treatment time, the jacket water temperature or the amount of water in order to control the state of coverage of the external additive.

In addition, examples of classifying apparatuses able to be used for sieving out coarse particles following the external addition include an Ultrasonic (available from Koei Sangyo Co., Ltd.); a Rezona Sieve or Gyro Sifter (available from Tokuju Co., Ltd.); a Vibrasonic System (available from Dalton); a Soniclean (available from Sinto Kogyo); a Turbo Screener (available from Turbo Kogyo); and a Micron Sifter (available from Makino Mfg. Co., Ltd.).

Below, the measurement methods of the physical properties of the toner and respective materials will be described.

Measurement of Brightness Average Value and Average Circle-Equivalent Diameter of Toner Particle and Resin Particle The brightness average value and the average circle-equivalent diameter of the toner particle and the resin particle are measured under the measurement and analysis conditions at the time of the calibration operation using a flow particle image analyzer "FPIA-3000" (manufactured by SYSMEX Co.). The brightness is on the basis of the monochrome 256 gradation (0 to 255) (brightness 0: dark, brightness 255: bright).

Specific measurement method is as follows.

First, 20 mL of ion exchanged water is placed in a container made of glass from which an impure solid or the like has been previously removed. Thereinto, as a dispersing agent, a diluted solution obtained by diluting "Contaminon N" (a 10-mass % aqueous solution of a neutral detergent for precise measurement meter cleaning with a pH of 7 including a non-ionic surfactant, a negative ionic surfactant, and an organic builder, manufactured by Wako Pure Chemical Industries, Ltd.) to 3 mass times with ion exchanged water is added in an amount of 0.2 mL. Further, 0.02 g of the measurement sample is added, and a dispersion treatment is performed using an ultrasonic disperser for 2 minutes, resulting in a measuring dispersed solution. At that step, cooling is performed appropriately so that the temperature of the dispersed solution may become from 10 °C. to 40 °C. As the ultrasonic disperser, a desktop ultrasonic cleaner disperser "VS-150" with an oscillation frequency of 50 kHZ, and an electric output of 150 W (manufactured by VELVO-CLEAR Co.), a prescribed amount of ion exchanged water is placed in a tank. Into the tank, the Contaminon N is added in an amount of 2 mL.

For the measurement, the flow particle image analyzer mounting "LUCPLFLN" (magnification of 20 times, numerical aperture of 0.40) thereon as an objective lens is used, and for the sheath solution, a particle sheath "PSE-900A" (manufactured by SYSMEX Co.) is used. The dispersed solution prepared according to the procedure is introduced into the flow particle image analyzer. With the HPF measurement mode, and the total count mode, 2000 toner particles and resin particles are measured. From the results, each brightness average value and each average circle-equivalent diameter of the toner particle and the resin particle are calculated.

As the measurement sample, when the toner particle and the resin particle are available, they may only be measured, respectively. When a toner is used as the measurement sample, the measurement can be performed in the following manner. The brightness average value of the toner particle can be obtained by setting the range of the circle-equivalent diameter at the range of the circle-equivalent diameter of the toner particle (e.g., from 4.0 μm to 10.0 μm) at the analysis mode. Whereas, the brightness average value of the resin particle can be obtained by setting the range of the circle-equivalent diameter at the range of the circle-equivalent diameter of the resin particle (e.g., from 0.5 μm to 3.0 μm) at the analysis mode.

The average circle-equivalent diameter of the toner particle can be obtained by setting the range of the brightness average value at the range of the brightness of the toner particle (e.g., from 40 to 80) at the analysis mode. Further, the average circle-equivalent diameter of the resin particle can be obtained by setting the range of the brightness average value at the range of the brightness of the resin particle (e.g., from 90 to 120) at the analysis mode.

The range of the circle-equivalent diameter of the toner particle, the range of the brightness thereof, and the circle-equivalent diameter of the resin particle, and the range of the brightness thereof can be grasped from, for example, each particle size distribution and each brightness of the toner particle and the resin particle measured from the toner.

For the measurement, before the start of the measurement, using a standard latex particle (e.g., "RESEARCH AND TEST PARTICLES Latex Microsphere Suspensions 5200A" manufactured by Duke Scientific Com. is diluted with ion exchanged water), auto focus adjustment is performed. Subsequently, focus adjustment is preferably carried out every 2 hours from the start of the measurement.

Incidentally, in Example of the present application, the flow particle image analyzer with a calibration certificate issued by SYSMEX Co., certifying that the calibration operation by SYSMEX Co., has been performed was used.

Measurement of Number of Resin Particles for Every 100 Toner Particles

The content on the basis of the number of resin particles for every 100 toner particles in the toner can be measured in the following manner. In the measurement of the average circle-equivalent diameter of the resin particle using a toner as the measurement sample, a frequency table is displayed, and the count number A of the particles included within the range of the circle-equivalent diameter of the resin particle (e.g., from 0.5 μm to 3.0 μm) and within the range of the brightness of the resin particle (e.g., from 90 to 120) is measured. Further, the count number B of all the particles is measured, and B-A is referred to as the count number of the toner particles. The number of the resin particles can be calculated from the count number A of the resin particles and the count number B-A of the toner particles obtained.

Measurement of Content Ratio of Resin Particle in Fine Particle

The measurement of the content ratio (number %) of the resin particles in the fine particles in a toner is as follows.

In the measurement of the toner by the flow particle image analyzer, in the same manner as with the measurement of the brightness average value and the average circle-equivalent diameter, in analysis of the measurement results, the brightness is set within the range of the brightness of the resin particle (e.g., from 90 to 120), and a frequency table is displayed. Then, the count number of the particles with a circle-equivalent diameter of from 0.5 μm to 3.0 μm is referred to as the "count number of the resin particles in the fine particles".

On the other hand, the count number of the particles with a circle-equivalent diameter of from 0.5 μm to 3.0 μm is referred to as the "count number of the fine particles". The content ratio of the resin particles in the fine particles can be determined from the "count number of the fine particles" and the "count number of the resin particles in the fine particles".

Measurement of Content Ratio of Fine Particles of Total of Toner Particles and Resin Particles The measurement of the content ratio (number %) of the fine particles of the total of the toner particles and the resin particles is as follows. The content can be measured from the count number A of the resin particles, the count number B-A of the toner particle, and the "count number of the fine particles".

Micro Compression Measurement of Toner Particle and Resin Particle

The confirmation of the fracture point at a load within the range of 0 to 10 mN of the toner particle and the resin particle can be read from the load displacement curve obtained by the micro compression measurement. Specifically, a fine particle crushing strength measuring device "NS-A100" (manufactured by Nano Seeds Corporation) is used. A specific measurement method of the load displacement curve is as follows.

As the measurement environment, a sample stage is kept at 25.0 °C. with an attached temperature adjustment device. A toner is applied to the sample stage, and then, is set at the foregoing temperature, and is held for 10 minutes or more. Then, the measurement is performed.

The measurement is performed using a flat indenter of 0.014 mN/m attached to the device as an indenter. The indentation amount of the indenter is set at 30 μm, and the moving speed of the indenter is set at 0.2 μm/s for performing the measurement.

Setting at the test load enables the measurement to the region where the measurement particle undergoes plastic deformation, and enables the measurement under the condition close to the stress at the development step and the fixing step. Incidentally, the number of indentation data is set at 3001. As the particle to be measured, the toner particle or the resin particle present alone at the measuring image by a microscope attached to the device is selected. The measurement is carried out with respect to given 100 particles. The number % of the particles each having a fracture point is calculated from the measurement of 100 particles.

For the measurement, the toner particle and the resin particle in the toner can be distinguished from each other from the appearance of the microscopic image. The one transparent in appearance is the resin particle, and the one that appears to be black is the toner particle.

The analysis is performed using an "A100 strain amount analysis graph forming tool" attached to a fine particle crushing strength measuring device "NS-A100". It is possible to confirm the presence or absence of the fracture point at a load within the range of 0 to 10 mN from the resulting load displacement curve. The definition of the fracture point will be described below.

Definition of Fracture Point:

Of the local maximum points in the load displacement curve in the micro compression measurement of the toner particle or the resin particle, the point at which the load amount at the local maximum point is minimum is defined as a fracture point.

Definition of Local Maximum Point:

In the load displacement curve of the displacement amount D and the load P, the point at which the toner particle or the resin particle starts to be deformed (in the measurement point group monotonously increasing over a displacement of at least 0.3 m, the first point in the first measurement point group) is referred to as a starting point. Then, at the measurement points after the starting point, the point at which the change amount ratio (dP/dD) of the load P to the displacement amount D is 0 is referred to as a point A. When the dP/dD is positive over a displacement of at least 0.1 μm to just before the point A, and the dP/dD is negative over a displacement of at least 0.1 μm from just after the point A, the point A is defined as the local maximum point.

Analysis of Structure of Resin Included in Toner Particle and Resin Particle by Time of Flight Secondary Ion Mass Spectrometer The analysis of the structure of the constituent resin of the surface of the toner particle and the resin particle, and calculation of the normalization intensity are confirmed by the time of flight secondary ion mass analyzer (TOF-SIMS). The used device and the measurement conditions will be shown below.

Incidentally, the measurement is performed with a mixture of the toner particle and the resin particle which have undergone removal of the external additive such as silica in the following manner.

Removal of External Additive

To 100 mL of ion exchanged water, sucrose (manufactured by KISHIDA CHEMICAL Co., Ltd.) is added in an amount of 160 g, and is dissolved with hot water bath, thereby preparing a cane sugar dope. Into a tube for centrifugation, 31 g of the cane sugar dope and 6 mL of Contaminon N (a 10 mass % aqueous solution of a neutral detergent for precision measuring instrument cleaning with a pH of 7 including a nonionic surfactant, a negative ionic surfactant, and an organic builder, manufactured by Wako Pure Chemical Industries, Ltd.) is placed, thereby manufacturing a dispersed solution. To the dispersed solution, a toner is added in an amount of 1 g, and the toner lump is broken up by the spatula, or the like.

The tube for centrifugation is shaken with a shaker ("KM Shaker" manufactured by IWAKI CO., LTD) under the condition of 350 reciprocations per minute for 30 minutes. After shaking, the solution is replaced in a glass tube for a swing rotor (50 mL), so that centrifugation is performed by a centrifuge (H-9R; manufactured by KOKUSAN Co., Ltd.) under the conditions of 58.33 S1 for 30 minutes. In the glass tube after the centrifugation, a toner particle and a resin particle are present at the uppermost layer, and an external additive such as silica is present on the aqueous solution side of the lower layer.

The toner particle and the resin particle of the uppermost layer are collected, and filtrated, and 2 L of ion exchanged water warmed to 40 °C. is passed therethrough for cleaning. The cleaned toner particle and resin particle are taken out.

Using the toner particle and the resin particle from which the external additive has been removed, the measurement is performed under the following conditions.

Measurement device: nanoTOF II (trade name, manufactured by ULVAC-PHI, INCORPORATED.)

primary ion species: $Bi^{3++}$ acceleration voltage: 30 kV primary ion current: 0.05 pA repeating frequency: 8.2 kHZ
raster mode: Unbunch
raster size: 300 μm×300 μm
measurement range: m/z=0.5 to 1850
measurement mode: Positive, Negative
neutralization electron gun: used
measurement time: 180 seconds
sample preparation: toner particle or resin particle is fixed at indium sheet
sample pretreatment: None Using standard software (TOF-DR) of ULVAC-PHI, INCORPORATED, the image is confirmed, and the peak within the range of m/z=0.5-1850 of the point corresponding to the resin particle and the point corresponding to the toner particle is confirmed. This indicates as follows. The peak of m/z193 derives from the dimer structure of ethylene glycol-terephthalic acid, and the peak of m/z341 derives from the trimer structure of terephthalic acid-ethylene glycol-terephthalic acid, and the peaks include the PET structure including the repeating structure of the formula (1) as the constituent component of the resin.

Further, the m/z341 normalization intensity in the resin particle can be calculated by dividing the intensity of the target ion peak by the total ion strength of m/z0.5-1850 (the equation (A)). The arithmetic average values of respective 10 points corresponding to the resin particles and corresponding to the toner particles are adopted.

By confirming the peaks of m/z=193 and m/z=341 by the measurement, it is possible to determine whether the toner particle or the resin particle to be measured has the resin having the structure expressed by the formula (1) as the repeating structure at the surface, or not. Further, when the peak of m/z=385 is also confirmed, confirmation can be performed up to a tetramer. Thus, it is possible to determine whether the measurement sample has the repeating structure of the structure of the formula (1), or not.

The point corresponding to the resin particle and the point corresponding to the toner particle are distinguished in the following manner.

Separately, a TOF-SIMS measurement sample is confirmed by an optical microscope. The measurement range is marked by the method such as a laser marker, and further, the image of the measurement range is acquired. The particle that appears to be transparent in an optical microscope image is a resin particle, and a black particle is a toner particle. If required, the brightness is calculated on the basis of the obtained image, and may be confirmed to fall within the predetermined range.

Then, the sample is subjected to the TOF-SIMS measurement, and the optical microscope checks the image against the TOF-SIMS image, thereby distinguishing between the resin particle and the toner particle, which can result in a spectrum to be targeted.

Measurement Method of m/z341 Normalization Intensity Under Conditions (3)

Normally, the TOF-SIMS is the surface analysis method, and the data in the depth direction becomes approximately 1-nm data. For this reason, the strength of the resin particle inside is measured after sputtering the resin particle by an argon gas cluster ion beam (Ar-GCIB), and cutting the surface.

With respect to the toner particle and the resin particle from which the external additive has been removed by the foregoing method, sputtering is performed under the following conditions (3). Then, the measurement on the resin particle is performed under the same conditions as those for the <Analysis of Structure of Resin Included in Toner Particle and Resin Particle by Time of Flight Secondary Ion Mass Spectrometer>. The obtained m/z341 normalization intensity is referred to as the m/z341 normalization intensity under the conditions (3).

$$m/z341 = \text{normalization intensity} = (\text{ion intensity of peak detected } m/z = 341) / (\text{total ion strength with } m/z = 0.5 \text{ to } 1850) \quad (A)$$

The sputtering conditions (3) are as follows.
Ar-GCIB conditions
acceleration voltage: 5 kV
current: 6.5 nA
raster size: 600×600 μm
irradiation time: 5 sec/cycle
sputtering time: 500 seconds Component Identification of Resin and Measurement of Weight Ratio Thereof by Nuclear Magnetic Resonance Spectroscopy (NMR)

To 20 mg of a toner particle or a resin particle, deuteriochloroform is added in an amount of 1 mL, thereby measuring the NMR spectrum of the proton of the dissolved resin. The molar ratio and the mass ratio of each monomer are calculated from the obtained NMR spectrum. As a result, it is possible to determine the content of the constituent monomer unit of the resin such as a polyester resin. It is also possible to calculate the content ratio of each monomer component in the binder resin.

For example, as the monomer of a polyester resin, the peak derived from terephthalic acid appears in the vicinity of 8.0 ppm, the peak derived from ethylene glycol appears in the vicinity of 4.7 ppm, the peak derived from bisphenol appears in the vicinity of 6.8 ppm, and the peak derived from styrene appears in the vicinity of 7.1 ppm. For this reason, the molar ratio and the mass ratio of each monomer can be calculated on the basis of the integral ratio of respective peaks of the monomers configuring the resin.

NMR device: JEOL RESONANCE ECX500
observed nucleus: proton
measurement mode: single pulse
Standard peak: TMS Method for Measuring Weight-Average Particle Diameter (D4) of Toner The weight-average particle diameter (D4) of the toner is calculated as follows. A "Multisizer 3 Coulter Counter" precise particle size distribution analyzer (registered trademark, Beckman Coulter, Inc.) based on the pore electrical resistance method and equipped with a 100 μm aperture tube is used as the measurement unit together with the accessory dedicated "Beckman Coulter Multisizer 3 Version 3.51" software (Beckman Coulter, Inc.) for setting the measurement conditions and analyzing the measurement data. Measurement is performed with 25,000 effective measurement channels.

The aqueous electrolytic solution used in measurement may be a solution of special grade sodium chloride dissolved in ion-exchanged water to a concentration of about 1 mass %, such as "ISOTON II" (Beckman Coulter, Inc.) for example.

The following settings are performed on the dedicated software prior to measurement and analysis.

On the "Change standard measurement method (SOMME)" screen of the dedicated software, the total count number in control mode is set to 50,000 particles, the number of measurements to 1, and the Kd value to a value obtained with "Standard particles 10.0 μm" (Beckman Coulter, Inc.). The threshold and noise level are set automatically by pushing the "Threshold/noise level measurement" button. The current is set to 1600 pA, the gain to 2, and the electrolytic solution to ISOTON II, and a check is entered for "Aperture tube flush after measurement".

On the "Conversion settings from pulse to particle diameter" screen of the dedicated software, the bin interval is set to the logarithmic particle diameter, the particle diameter bins to 256, and the particle diameter range to 2 to 60 μm.

The specific measurement methods are as follows.

(1) About 200 mL of the aqueous electrolytic solution is placed in a glass 250 mL round-bottomed beaker dedicated to the Multisizer 3, the beaker is set on the sample stand, and stirring is performed with a stirrer rod counter-clockwise at a rate of 24 rps. Contamination and bubbles in the aperture tube are then removed by the "Aperture tube flush" function of the dedicated software.

(2) 30 mL of the same aqueous electrolytic solution is placed in a glass 100 mL flat-bottomed beaker, and about 0.3 mL of a dilution of "Contaminon N" (a 10 mass % aqueous solution of a pH 7 neutral detergent for washing precision instruments, comprising a nonionic surfactant, an anionic surfactant, and an organic builder, manufactured by Wako Pure Chemical Industries, Ltd.) diluted about three times by mass with ion-exchange water is added.

(3) An ultrasonic disperser "Ultrasonic Dispersion System Tetra150" (Nikkaki Bios Co., Ltd.) with an electrical output of 120 W equipped with two built-in oscillators having an oscillating frequency of 50 kHz with their phases shifted by 1800 from each other is prepared. About 3.3 L of ion-exchange water is added to the water tank of the ultrasonic disperser, and about 2 mL of Contaminon N is added to the tank.

(4) The beaker of (2) above is set in the beaker-fixing hole of the ultrasonic disperser, and the ultrasonic disperser is operated. The height position of the beaker is adjusted so as to maximize the resonant condition of the liquid surface of the aqueous electrolytic solution in the beaker.

(5) The aqueous electrolytic solution in the beaker of (4) above is exposed to ultrasound as about 10 mg of toner is added bit by bit to the aqueous electrolytic solution, and dispersed. Ultrasound dispersion is then continued for a further 60 seconds. During ultrasound dispersion, the water temperature in the tank is adjusted appropriately to from 10 °C. to 40 °C.

(6) The aqueous electrolytic solution of (5) above with the toner dispersed therein is dripped with a pipette into the round-bottomed beaker of (1) above set on the sample stand, and adjusted to a measurement concentration of about 5%. Measurement is then performed until the number of measured particles reaches 50000.

(7) The weight average particle diameter (D4) is calculated by analyzing measurement data using the accompanying dedicated software. Moreover, when setting the graph/vol. % with the dedicated software, the "average diameter" on the "Analysis/volume-based statistical values (arithmetic mean)" screen is weight-average particle diameter (D4).

Confirmation Method of Inclusion of Compound a, and Detection of Compound a as Cation and Compound B as Anion For the confirmation method of inclusion of the compound A and the compound B, the method using liquid chromatograph ESI/MS (electrospray ionization mass spectrometry), or the known analysis method such as $^{1}H$ Nuclear magnetic resonance spectrochemical analysis can be used. In the present disclosure, the analysis method suing liquid chromatograph ESI/MS is used. Below, the analysis method will be described.

For a sample, a toner is used. The sample adjusted according to the following elution conditions A is separated into a solid content and a supernatant by the centrifugation conditions A.

The supernatant obtained by the adjustment is supplied to the following liquid chromatograph ESI/MS analyzer, and ESI/MS analysis is performed under the conditions of the analysis conditions A.

Elution conditions A: using (JISK8891 standard equivalent product) 10 times based on the mass of the toner (10 g) at 25 °C, and using a multi-stirrer (KSS-8; manufactured by AS ONE Corporation) as a stirrer, stirring is performed at a rotation speed of a rotor of 200 rpm for 10 hours. For stirring, a triangle rotor with a total length×one side length: 40×14 mm (001.440; manufactured by AS ONE Corporation) is used.

Centrifugation conditions A: at 25 °C. at a rotation radius of 10.1 cm, and a rotation speed of 3500 rpm, rotation is performed for 30 minutes. As a centrifugation device, a centrifuge (H-9R; manufactured by KOKUSAN Co., Ltd.) can be used.

Measurement device: Ultimate 3000 (manufactured by Thermo Fisher Scientific Co.)

mass spectrometer: LCQ Fleet (manufactured by Thermo Fisher Scientific Co.)

analysis conditions A: under the following conditions, the one ionized under the conditions of a capillary voltage of 35 V, and a tube lens voltage of 110 V is detected as a cation, the one ionized under the conditions of a capillary voltage of −35 V and a tube lens voltage of −110 V is detected as an anion, and each MS spectrum of the cation and the anion are acquired.

ionization method: electrospray method (ESI)

Sheath Gas: 10 (arb. unit.)

Aux Gas: 5 (arb. unit.)

spray voltage: 5 kV capillary temperature: 275 °C.

mobile phase: methanol (JISK8891 standard equivalent product)

column: not used (not using stationary phase)

flow rate: 1 ml/min injection amount: 10 μl chromatogram detector: UV detector

MS acquisition time: 5 min

MS measurement range: 50 to 1500 m/z

EXAMPLES

Below, the present invention will be described in further details by way of Examples and Comparative Examples. However, the present invention is not limited thereto at all. The term "part" used in Examples is based on mass unless otherwise specified.

Below, manufacturing examples of a toner will be described.

Manufacturing Example of Polyester Resin 1

Into a reaction vessel equipped with a stirrer, a thermometer, a nitrogen inlet tube, a dewatering tube, and a decompression device, 26.5 parts of terephthalic acid, 0.7 part of isophthalic acid, 46.9 parts of propylene oxide 2 mol adduct of bisphenol A, 5.0 parts of ethylene oxide 2 mol adduct of bisphenol A, and 15.9 parts of ethylene glycol were added, and heated with stirring to a temperature of 130 °C. Subsequently, as an esterification catalyst, tin di(2-ethylhexanoate) was added in an amount of 0.52 part for every 100.0 parts of the total amount of the monomers. Then, the temperature was raised to 200 °C, so that condensation polymerization was performed until a desired molecular weight was achieved. Further, trimellitic anhydride was added in an amount of 5.0 parts, resulting in an amorphous polyester resin 1.

Manufacturing Example of Polyester Resin 2

A polyester resin 2 was obtained in the same manner as with the polyester resin 1, except for changing the ratio of each monomer component to the following ratio.

terephthalic acid: 23.4 parts
isophthalic acid: 2.7 parts
trimellitic acid: 5 parts
bisphenol A-propylene oxide 2.2 mol adduct: 55.5 parts
bisphenol A-ethylene oxide 2.2 mol adduct: 4.8 parts
ethylene glycol: 8.8 parts
tin di(2-ethylhexanoate): 0.5 part Manufacturing Example of Polyester Resin 3

A polyester resin 3 was obtained in the same manner as with the polyester resin 1, except for changing the ratio of each monomer component to the following ratio.

terephthalic acid: 33.9 parts
trimellitic acid: 6.1 parts
bisphenol A-propylene oxide 2.2 mol adduct: 26.4 parts
ethylene glycol: 33.6 parts
tin di(2-ethylhexanoate): 0.5 part Manufacturing Example of Polyester Resin 4

A polyester resin 4 was obtained in the same manner except as with the polyester resin 1, for changing the ratio of each monomer component to the following ratio.

terephthalic acid: 52.7 parts
trimellitic acid: 1.1 parts
bisphenol A-propylene oxide 2.2 mol adduct: 52.7 parts
bisphenol A-ethylene oxide 2.2 mol adduct: 14.9 parts
tin di(2-ethylhexanoate): 0.5 part Preparation of Polyester Resin Particle-Dispersed Solution 1 polyester resin 1: 200 parts
ion exchanged water: 500 parts

The materials were placed in a container made of stainless steel, and was heated and molten to 95 °C. in warm bath. Using a homogenizer (ULTRA-TURRAX T50 manufactured by IKA Co.), 0.1 mol/L sodium hydrogencarbonate was added with sufficient stirring at 7800 rpm, thereby increasing the pH to more than 7.0. Subsequently, a mixed solution of 3 parts of sodium dodecylbenzenesulfonate and 297 parts of ion exchanged water was gradually added dropwise for emulsification dispersion, resulting in a polyester resin particle-dispersed solution 1.

The particle size distribution of the polyester resin particle-dispersed solution 1 was measured using a grain size measurement device (LA-960V2 manufactured by Horiba Seisakusho Co., Ltd.). As a result, the number-average particle diameter of the included polyester resin particles was found to be 0.25 μm, and a coarse particle with a size of more than 1 μm was not observed.

Preparation of Polyester Resin Particle-Dispersed Solution 4

A polyester resin particle-dispersed solution 4 was obtained in the same manner as in the manufacturing example of the polyester resin particle-dispersed solution 1, except for changing the polyester resin 1 to the polyester resin 4. The particle size distribution of the polyester resin particle-dispersed solution was measured using a grain size measurement device (LA-960V2 manufactured by Horiba Seisakusho Co., Ltd.). As a result, the number-average particle diameter of the included polyester resin particles was found to be 0.25 μm, and a coarse particle with a size of more than 1 m was not observed.

Preparation Example of Wax Particle-Dispersed Solution ion exchanged water 500 parts
wax (behenyl behenate, melting point: 72.1 °C.) 250 parts The materials were placed in a container made of stainless steel, and were heated to 95 °C. and molten in hot water bath. Using a homogenizer (ULTRA-TURRAX T50: manufactured by IKA Co.), 0.1 mol/L sodium hydrogencarbonate was added with sufficiently stirring at 7800 rpm, thereby increasing the pH to more than 7.0.

Subsequently, a mixed solution of 5 parts of sodium dodecyl benzenesulfonate and 245 parts of ion exchanged water was gradually added dropwise, and emulsification dispersion was performed. The particle size distribution of the wax particles included in the wax particle-dispersed solution was measured using a grain size measurement device (LA-960V2 manufactured by Horiba Seisakusho Co., Ltd.). As a result, the number-average particle diameter of the included wax particles was found to be 0.35 m, and a coarse particle with a size of more than 1 μm was not observed.

Preparation Example of Colorant Particle-Dispersed Solution carbon black Nipex 35 (manufactured by Orion Engineered Carbons Co.) 100 parts
sodium dodecyl benzenesulfonate 5 parts
ion exchanged water 400 parts The materials described up to this point were mixed, and dispersed using a sand grinder mill. The particle size distribution of the colorant particles included in the colorant particle-dispersed solution was measured using a grain size measurement device (LA-960V2 manufactured by Horiba Seisakusho Co., Ltd.). As a result, the number-average particle diameter of the included colorant particles was found to be 0.2 m, and a coarse particle with a size of more than 1 μm was not observed.

Manufacturing Example of Toner Particle 1 polyester resin particle-dispersed solution 1: 500 parts
colorant particle-dispersed solution: 50 parts
wax particle-dispersed solution: 50 parts
aliphatic alcohol alkylene oxide adduct (aliphatic alcohol kind: lauryl alcohol, aliphatic alcohol, number of parts: 190 parts, ethylene oxide number of parts: 310 parts) 5 parts Into a reactor (a flask with a volume of 1 L, an anchor impeller with a baffle), the polyester resin particle-dispersed solution 1, a wax particle-dispersed solution, and an aliphatic alcohol alkylene oxide adduct were charged, and uniformly mixed. On the other hand, a colorant particle-dispersed solution was uniformly mixed in a 500-mL beaker, and the resulting solution was gradually added with stirring to a reactor, resulting in a mixed dispersed solution. While stirring the obtained mixed dispersion, an aluminum sulfate aqueous solution was added dropwise in an amount of 0.5 part as a solid content, thereby forming an aggregated particle.

After completion of dropwise addition, the inside of the system was replaced using nitrogen, and was held at 50 °C. for 1 hour, and further at 55 °C. for 30 minutes. Herein, a polyester resin particle-dispersed solution 1 was added in an amount of 20 parts, and was further held for 30 minutes. Then, the pH was set at 9.0 using a 5% sodium hydroxide aqueous solution.

Subsequently, the temperature was increased, and the solution was held at 90 °C. for 30 minutes. Thereafter, the temperature was decreased to 63 °C. Then, the solution was held for 3 hours, thereby forming a fused particle. The reaction at the step was effected under a nitrogen atmosphere. After completion of a prescribed time, cooling was performed at a ramp down rate of 0.5 °C. per minute until the temperature became room temperature.

After cooling, the reaction product was subjected to solid liquid separation under a pressure of 0.4 MPa with a pressure filter with a volume of 10 L, resulting in a toner cake. Subsequently, ion exchanged water was added to the pressure filter until the pressure filter became full, and cleaning was performed under a pressure of 0.4 MPa.

Further, cleaning was performed in the same manner, and cleaning was performed a total of 3 times. Thereafter, under a pressure of 0.4 MPa, solid liquid separation was performed, and then fluidized bed drying was performed at 45 °C, resulting in a toner particle 1 with a weight-average particle diameter (D4) of 6.4 μm.

Manufacturing Example of Toner Particle 2

A toner particle 2 was obtained in the same manner as in the manufacturing example of the toner particle 1, except for changing the aliphatic alcohol alkylene oxide adduct to sodium dodecyl benzenesulfonate.

Manufacturing Example of Toner Particle 6

A toner particle 6 was obtained in the same manner as in the manufacturing example of the toner particle 1, except for changing the polyester resin 1 to the polyester resin 4.

Manufacturing Example of Toner Particle 3 polyester resin 1: 100.0 parts
wax (behenyl behenate, melting point: 72.1 °C.): 6.0 parts
carbon black Nipex 35 (manufactured by Orion Engineered Carbons Co.): 10 parts
iron complex of monoazo dye (T-77 manufactured by Hodogaya Chemical Co., Ltd.): 2.0 parts The materials were mixed at a rotation speed of 20 s4, for a rotation time of 5 min using a Henschel Mixer (FM-75 model, manufactured by Mitsui Mining Co., Ltd.), followed by kneading with a double shaft kneader (PCM-30 model, manufactured by IKEGAI Co., Ltd.) set at temperature of 130 °C. The obtained kneaded product was cooled to 25 °C, and was coarsely pulverized to 1 mm or less by a hammer mill, resulting in a coarsely pulverized product. The obtained coarsely pulverized product was finely pulverized by a mechanical pulverizer (T-250, manufactured by TURBO Corp.). Using a multi-grade classifier using the Coanda effect, classification was performed, resulting in a toner particle 3 with a weight-average particle diameter (D4) of 7.2 μm.

Manufacturing Example of Toner Particles 4 and 5

Toner particles 4 and 5 were obtained in the same manner as in the manufacturing example of the toner particle 3, except for using the polyester resin 2 in place of the polyester resin 1 for the toner particle 4, and using the polyester resin 3 for the toner particle 5. The physical properties are shown in Table 1.

TABLE 1

| Toner particle No. | Manufacturing method | Resin | Compound A | Compound B | Particle diameter (μm) | Brightness average value |
|---|---|---|---|---|---|---|
| 1 | EA | Polyester resin 1 | Aliphatic alcohol alkylene oxide adduct | Na dodecylbenzenesulfonate | 6.4 | 60 |
| 2 | EA | Polyester resin 1 | Not present | Na dodecylbenzenesulfonate | 6.5 | 60 |
| 3 | P | Polyester resin 1 | Not present | Not present | 7.2 | 60 |
| 4 | P | Polyester resin 2 | Not present | Not present | 7.0 | 60 |
| 5 | P | Polyester resin 3 | Not present | Not present | 7.2 | 60 |
| 6 | EA | Polyester resin 4 | Aliphatic alcohol alkylene oxide adduct | Na dodecylbenzenesulfonate | 6.5 | 60 |

In the table, "EA" indicates "Emulsification aggregation" and "P" indicates "Pulverization", and the particle diameter represents the weight-average particle diameter (D4). The brightness average value is the brightness average value on the basis of the monochrome 256 gradation.

Manufacturing Example of Resin Particle 1 polyester resin particle-dispersed solution 1: 500 parts
ion exchanged water: 160 parts Into a reactor (a flask with a volume of 1 L, an anchor impeller with an baffle), the polyester resin particle-dispersed solution 1 and ion exchanged water were uniformly mixed, and an aluminum sulfate aqueous solution was added dropwise in an amount of 0.5 part as a solid content with stirring, thereby forming an aggregated particle.

After completion of dropwise addition, the inside of the system was replaced using nitrogen, and the temperature was raised to 55 °C. The formed aggregated particle was appropriately confirmed using a Coulter multisizer III.

When an aggregated particle with a weight-average particle diameter (D4) of about 1.5 μm was formed, the pH was set at 9.0 using a 5% sodium hydroxide aqueous solution.

Subsequently, the temperature was raised, and at 90 °C, the solution was held for 30 minutes. Thereafter, the temperature was decreased to 63 °C, and then, the solution was held for 3 hours, thereby forming a fused particle. The reaction at the step was effected under a nitrogen atmosphere. After completion of a prescribed time, cooling was performed at a ramp down rate of 0.5 °C. per minute until the temperature became room temperature.

After cooling, solid liquid separation was performed with a pressure filter, and cleaning was performed with ion exchange water a total of 3 times. Thereafter, fluidized bed drying was performed at 45 °C, resulting in a resin particle 1 with a weight-average particle diameter (D4) of about 1.5 μm.

Manufacturing Example of Resin Particle 2

Into a 5-L reaction vessel equipped with a stirring device, a temperature sensor, a cooling tube, and a nitrogen introduction device, a surfactant aqueous solution obtained by dissolving 4 parts by mass of sodium dodecyl benzenesulfonate in 3040 parts by mass of ion exchanged water was charged. Further, a polymerization initiator solution obtained by dissolving 10 parts by mass of potassium persulfate in 400 parts by mass of ion exchanged water was added, and the liquid temperature was raised to 75 °C. Herein, 530 parts by mass of styrene, 200 parts by mass of n-butyl acrylate, and 16 parts by mass of n-octyl mercaptan were added, and were heated with stirring for 2 hours, thereby performing polymerization. As a result, a styrene acrylic resin particle-dispersed solution was prepared.

styrene acrylic resin particle-dispersed solution: 800 parts
polyester resin particle-dispersed solution 1: 50 parts The styrene acrylic resin particle-dispersed solution was transferred into a reactor (a flask with a volume of 1 L, an anchor impeller with an baffle), to which an aluminum sulfate aqueous solution was added dropwise with stirring in an amount of 0.5 part as a solid content, thereby forming an aggregated particle.

After completion of the dropwise addition, the inside of the system was replaced using nitrogen, and the temperature was raised to 55 °C. The formed aggregated particle was appropriately confirmed using a Coulter multisizer III. When an aggregated particle with a weight-average particle diameter (D4) of about 1.2 μm was formed, the polyester resin particle-dispersed solution 1 was added. Further, after holding for 30 minutes, the pH was set at 9.0 using a 5% sodium hydroxide aqueous solution.

Subsequently, the temperature was raised, and at 90 °C, the solution was held for 30 minutes. Thereafter, the temperature was decreased to 63 °C, and then, the solution was held for 3 hours, thereby forming a fused particle. The reaction at the step was effected under a nitrogen atmosphere. After completion of a prescribed time, cooling was performed at a ramp down rate of 0.5 °C. per minute until the temperature became room temperature.

After cooling, solid liquid separation was performed with a pressure filter, and cleaning was performed with ion exchange water a total of 3 times. Thereafter, fluidized bed drying was performed at 45 °C, resulting in a resin particle 2 with a weight-average particle diameter (D4) of about 1.8 μm.

Manufacturing Examples of Resin Particles 3, 4, and 5

Resin particles 3, 4, and 5 were obtained in the same manner as in the manufacturing example of the resin particle 1, except for using the polyester resin particle-dispersed solution 2 for the resin particle 3, using the polyester resin particle-dispersed solution 3 for the resin particle 4, and using the polyester resin particle-dispersed solution 4 for the resin particle 5 in place of the polyester resin particle-dispersed solution 1. The physical properties are shown in Table 2.

Manufacturing Example of Resin Particle 6

In the manufacturing example of the resin particle 1, into a reactor (a flask with a volume of 1 L, an anchor impeller with a baffle), the polyester resin particle-dispersed solution 1 and ion exchanged water were uniformly mixed, to which an aluminum sulfate aqueous solution was added dropwise in an amount of 0.5 part with stirring as a solid content, thereby forming an aggregated particle.

After completion of the dropwise addition, the inside of the system was replaced using nitrogen, and the temperature was raised to 55 °C. The formed aggregated particle was appropriately confirmed using a Coulter multisizer III. When an aggregated particle with a weight-average particle diameter (D4) of about 2.5 μm was formed, the pH was set at 9.0 using a 5% sodium hydroxide aqueous solution.

Subsequently, the temperature was raised, and at 90 °C, the solution was held for 60 minutes. Thereafter, the temperature was decreased to 63 °C, and then, the solution was held for 4 hours, thereby forming a fused particle. The reaction at the step was effected under a nitrogen atmosphere. After completion of a prescribed time, cooling was performed at a ramp down rate of 0.5 °C. per minute until the temperature became room temperature.

After cooling, solid liquid separation was performed with a pressure filter, and cleaning was performed with ion exchange water a total of 3 times. Thereafter, fluidized bed drying was performed at 45 °C, resulting in a resin particle 6 with a weight-average particle diameter (D4) of about 2.5 μm.

Manufacturing Example of Resin Particle 7

A resin particle 7 was obtained in the same manner as in the manufacturing example of the resin particle 1, except for adding a colorant particle-dispersed solution in an amount of 0.18 part by mass.

Manufacturing Example of Resin Particle 8

A resin particle 8 was obtained in the same manner as in the manufacturing example of the resin particle 1, except for adding a colorant particle-dispersed solution in an amount of 0.20 part by mass

TABLE 2

| | Component | Average circle-equivalent diameter μm | Brightness average value |
|---|---|---|---|
| Resin Particle 1 | Polyester resin 1 | 1.5 μm | 110 |
| Resin Particle 2 | Polyester resin 1, Styrene acrylic resin | 1.8 μm | 110 |

TABLE 2-continued

| | Component | Average circle-equivalent diameter μm | Brightness average value |
|---|---|---|---|
| Resin Particle 3 | Polyester resin 2 | 1.5 μm | 110 |
| Resin Particle 4 | Polyester resin 3 | 1.5 μm | 110 |
| Resin Particle 5 | Polyester resin 4 | 1.5 μm | 110 |
| Resin Particle 6 | Polyester resin 1 | 2.5 μm | 120 |
| Resin Particle 7 | Polyester resin 1 | 0.8 μm | 90 |
| Resin Particle 8 | Polyester resin 1 | 1.5 μm | 80 |

The brightness average value is the brightness average value on the basis of the monochrome 256 gradation.

Manufacturing Example of Toner 1

To the toner particle 1 (100.0 parts) obtained above, the resin particle 1 (2 parts) and a silica particle (RX200: a primary average particle diameter of 12 nm, and HMDS treatment, manufactured by Nippon Aerosil Co., Ltd.) (1.5 parts) were externally mixed by a FM10C (manufactured by NIPPON COKE & ENGINEERING Co., LTD). The external addition conditions were as follows: the lower blade was set as an A0 blade, and the interval from the wall of the deflector was set at 20 mm, the charging amount of the toner particle: 2.0 kg, the rotation speed: 66.6 s4, the external addition time: 10 minutes, and cooling water with a temperature of 20 °C./a flow rate of 10 L/min.

Subsequently, sieving was performed with a mesh having an opening size of 200 μm, resulting in a toner 1. The formulation and the physical properties of the resulting toner 1 are shown in Tables 3 and 4.

Manufacturing Examples of Toners 2 to 20

Toners 2 to 20 were obtained in the same manner as in the manufacturing example of the toner 1, except for changing the kind of the toner particle, the kind of the resin particle, and the addition amount as in Table 3. The physical properties of the obtained toners 2 to 20 are shown in Tables 3 and 4.

TABLE 3

| Example No. | Toner No. | Toner particle No. | Resin particle No. | Resin particle amount (parts) | Resin particle average circle-equivalent diameter μm | Resin particle brightness average value | Toner particle brightness average value | Presence of toner particle formula (1) | Presence of resin particle formula (1) | Compound A | Compound B |
|---|---|---|---|---|---|---|---|---|---|---|---|
| 1 | 1 | 1 | 1 | 2.0 | 1.5 μm | 110 | 60 | Present | Present | Y | Y |
| 2 | 2 | 2 | 1 | 2.0 | 1.5 μm | 110 | 60 | Present | Present | N | Y |
| 3 | 3 | 2 | 1 | 1.3 | 1.5 μm | 110 | 60 | Present | Present | N | Y |
| 4 | 4 | 2 | 1 | 5.5 | 1.5 μm | 110 | 60 | Present | Present | N | Y |
| 5 | 5 | 2 | 1 | 4.4 | 1.5 μm | 110 | 60 | Present | Present | N | Y |
| 6 | 6 | 2 | 2 | 4.4 | 1.8 μm | 110 | 60 | Present | Present | N | Y |
| 7 | 7 | 3 | 2 | 4.4 | 1.8 μm | 110 | 60 | Present | Present | N | N |
| 8 | 8 | 4 | 3 | 4.4 | 1.5 μm | 110 | 60 | Present | Present | N | N |
| 9 | 9 | 5 | 4 | 4.4 | 1.5 μm | 110 | 60 | Present | Present | N | N |
| 10 | 10 | 2 | 2 | 1.3 | 1.8 μm | 110 | 60 | Present | Present | N | Y |
| 11 | 11 | 3 | 2 | 1.3 | 1.8 μm | 110 | 60 | Present | Present | N | N |
| 12 | 12 | 4 | 3 | 1.3 | 1.5 μm | 110 | 60 | Present | Present | N | N |
| 13 | 13 | 5 | 4 | 1.3 | 1.5 μm | 110 | 60 | Present | Present | N | N |
| 14 | 14 | 1 | 6 | 2.0 | 2.5 μm | 120 | 60 | Present | Present | Y | Y |
| 15 | 15 | 1 | 7 | 2.0 | 0.8 μm | 90 | 60 | Present | Present | Y | Y |
| C.E. 1 | 16 | 1 | 1 | 0.9 | 1.5 μm | 110 | 60 | Present | Present | Y | Y |
| C.E. 2 | 17 | 1 | 1 | 6.6 | 1.5 μm | 110 | 60 | Present | Present | Y | Y |
| C.E. 3 | 18 | 6 | 5 | 2.0 | 1.5 μm | 110 | 60 | Absent | Absent | Y | Y |
| C.E. 4 | 19 | 3 | 1 | 0.9 | 1.5 μm | 110 | 60 | Present | Present | N | N |
| C.E. 5 | 20 | 1 | 8 | 2.0 | 1.5 μm | 80 | 60 | Present | Present | Y | Y |

In the table, "C.E." indicates "Comparative Example". The resin particle amount is the amount for every 100 parts by mass of the toner particles. The brightness average value is the brightness average value on the basis of the monochrome 256 gradation.

In the columns of the presence of the toner particle formula (1) and the presence of the resin particle formula (1), when a resin having a repeating structure of the structure expressed by the formula (1) is included at the surface, "Present" is described, and when the resin is not included at the surface, "Absent" is described.

In the column of the compound A, in the case where the compound A was detected as having been ionized to be a cation when analysis was performed under the analysis conditions A, "Y" is described, and when detection was not achieved, "N" is described. Whereas, in the column of the compound B, in the case where the compound B was detected as having been ionized to be an anion when analysis was performed under the analysis conditions A, "Y" is described, and when detection was not achieved, "N" is described.

TABLE 4

| Example No. | Toner No. | Fine particle content in toner (%) | Resin particle amount in toner (number) | Resin particle content in fine particle (%) | Resin particle fracture point | Toner particle fracture point | m/z341 normalization intensity under condition (2) | m/z341 normalization intensity under condition (3) |
|---|---|---|---|---|---|---|---|---|
| 1 | 1 | 15 | 13 | 73 | Absent | Present | 0.0024 | 0.0022 |
| 2 | 2 | 15 | 13 | 73 | Absent | Present | 0.0024 | 0.0022 |
| 3 | 3 | 9 | 7 | 78 | Absent | Present | 0.0024 | 0.0022 |
| 4 | 4 | 45 | 30 | 67 | Absent | Present | 0.0024 | 0.0022 |
| 5 | 5 | 41 | 24 | 59 | Absent | Present | 0.0024 | 0.0022 |
| 6 | 6 | 41 | 24 | 59 | Absent | Present | 0.0024 | 0.0002 |
| 7 | 7 | 45 | 24 | 53 | Absent | Present | 0.0024 | 0.0002 |
| 8 | 8 | 45 | 24 | 53 | Absent | Absent | 0.0010 | 0.0010 |
| 9 | 9 | 45 | 24 | 53 | Absent | Present | 0.0028 | 0.0028 |
| 10 | 10 | 9 | 7 | 78 | Absent | Present | 0.0024 | 0.0002 |
| 11 | 11 | 9 | 7 | 78 | Absent | Present | 0.0024 | 0.0002 |
| 12 | 12 | 9 | 7 | 78 | Absent | Absent | 0.0010 | 0.0010 |
| 13 | 13 | 9 | 7 | 78 | Absent | Present | 0.0028 | 0.0028 |
| 14 | 14 | 15 | 12 | 70 | Absent | Present | 0.0024 | 0.0022 |
| 15 | 15 | 15 | 14 | 75 | Absent | Present | 0.0024 | 0.0022 |
| C.E. 1 | 16 | 10 | 4 | 40 | Absent | Present | 0.0024 | 0.0022 |
| C.E. 2 | 17 | 40 | 45 | 91 | Absent | Present | 0.0024 | 0.0022 |
| C.E. 3 | 18 | 15 | 10 | 67 | Present | Present | 0.0000 | 0.0000 |
| C.E. 4 | 19 | 24 | 4 | 17 | Absent | Present | 0.0024 | 0.0022 |
| C.E. 5 | 20 | 15 | 4 | 27 | Absent | Present | 0.0024 | 0.0022 |

In the table, "C.E." indicates "Comparative Example". The term "fine particle content in toner" is the content ratio (number %) of the fine particles of the total number of the toner particles and the resin particles. The term "resin particle amount in toner" is the content (number) of the resin particles for every 100 toner particles. The term "resin particle content in fine particle" is the content ratio (number %) of the resin particle in the fine particle.

In the table, in the column of the "resin particle fracture point", when the ratio of the resin particles each not having a fracture point at a load within the range of 0 to 10 mN in the load displacement curve obtained by the micro compression measurement of the resin particle is 90 number % or more, "Absent" is described. On the other hand, when the ratio of the resin particles each not having the fracture point is less than 90 number %, "Present" is described.

In the column of the "toner particle fracture point", when the ratio of a toner particles each having a fracture point at a load within the range of 0 to 10 mN in the load displacement curve obtained by the micro compression measurement of the toner particle is 80 number % or more, "Present" is described. On the other hand, when the ratio of toner particles each having the fracture point is less than 80 number %, "Absent" is described.

Using the obtained toner, the following evaluation was performed.

Image Evaluation

The image evaluation was performed using a speed-up gear obtained by partially converting a commercially available color laser printer (HP LaserJet Enterprise Color M555dn, manufactured by HP Co.). The conversion enabled the operation with mounting of only a one-color process cartridge. A toner was extracted from a black cartridge, and another toner to be evaluated instead was filled in an amount of 100 g, so that the evaluation was performed.

Image Quality Evaluation Under Ordinary Temperatures Ordinary Humidities Environment For the purpose of testing the image quality of the toner, the density and the fogging under ordinary temperatures ordinary humidities environment (25 °C./65% RH) were evaluated in the following manner.

Under ordinary temperatures ordinary humidities environment, an image with a coverage rate of 1.0% was outputted to a total of 2000 prints at a rate of 1000 prints per day with an intermittent time of 2 seconds for every two prints on CANON color laser copier sheet (A4: 81.4 g/$m^2$, hereinafter, the present sheet is assumed to be used unless otherwise specified). With the cartridge after output of 2000 prints, the fogging on the drum was taped, and collected for evaluation, and further, a solid image and a halftone image were printed.

The fogging was measured using a reflection concentration meter (REFLECTOMETER MODEL TC-6DS manufactured by TOKYO DENSHOKU Co., Ltd.). The (Ds-Dr) represents the fogging concentration (%) where Ds denotes the blank part reflection concentration worst value of the tape part, and Dr denotes the reflection concentration average value of paper of the taping part. For filters, 3 kinds of filters of green, amber, and blue were used for the measurement, and the worst value was assumed to be the fogging concentration.

Regarding the fogging concentration evaluation, determination was achieved on the basis of the following criteria. C or higher was determined as good.

Evaluation Criteria

A: fogging concentration less than 0.5%
B: fogging concentration 0.5% or more and less than 1.5%
C: fogging concentration 1.5% or more and less than 3.0%
D: fogging concentration 3.0% or more The image densities were measured at 5 points by a color reflection concentration meter (X-Rite 404A), and the average value thereof was calculated. The evaluation ranks were evaluated according to the following criteria. C or higher was determined as good.

A: 1.2 or more
B: 1.1 or more and less than 1.2
C: 1.0 or more and less than 1.1
D: less than 1.0

The halftone image density non-uniformity due to the C roller contamination attendant on the faulty cleaning was evaluated according to the following criteria. The halftone image density non-uniformity derived from the C roller contamination to be herein evaluated is the non-uniformity generated on the entire surface in the longitudinal direction with a width of 2 cm or more from the end. At the portion of the C roller contaminated, the image density becomes higher. The densities of the image end and the center thereof were measured using a color reflection concentration meter (X-Rite 404A), and the difference in density therebetween was assumed to be the value of the non-uniformity. C or more was determined as good.

Evaluation Criteria

A: image density non-uniformity less than 0.02%
B: image density non-uniformity 0.02% or more and less than 0.05%
C: image density non-uniformity 0.05% or more and less than 0.10%
D: image density non-uniformity 0.10% or more Low Temperature Low Humidity Environment Cleaning Performance The cleaning performance under the low temperature low humidity environment (10 °C./15% RH) was evaluated in the following manner.

Under the low temperature low humidity environment, an image with a coverage rate of 1.0% was outputted to a total of 2000 prints at a rate of 1000 prints per day with an intermittent time of 2 seconds for every 2 prints. With the cartridge after output of 2000 prints, a total of 4 prints of 3 all black image prints, and one all white image print were continuously outputted. Finally, a halftone image was printed.

With the present evaluation method, when the cleaning performance of the toner was reduced, in the all white image after all black image output, streaks-shaped image defect (longitudinal black stripe) due to the faulty cleaning (toner slippage) was generated.

Regarding the cleaning performance, determination was achieved according to the following criteria. C or more was determined as good.

Evaluation Criteria

In the all while image after output of 5 all black image prints,
A: streaks-shaped image defect is not observed
B: 1 to 3 microscopic streaks-shaped defects each with a width of less than 1 mm are observed
C: 4 to 10 microscopic streaks-shaped defects each with a width of less than 1 mm are observed
D: 11 or more microscopic streaks-shaped defects each with a width of less than 1 mm are observed. Alternatively, a streaks-shaped defect with a width of 1 mm or more is observed.

Further, when the C roller contamination is accumulated, it appears as image density non-uniformity of the halftone image. The halftone image density non-uniformity due to the C roller contamination attendant on the faulty cleaning was evaluated according to the following criteria. The halftone image density non-uniformity derived from the C roller contamination to be herein evaluated is the non-uniformity generated on the entire surface in the longitudinal direction with a width of 2 cm or more from the end. At the portion of the C roller contaminated, the image density becomes higher. The densities of the image end and the center thereof were measured using a color reflection concentration meter (X-Rite 404A), and the difference in density therebetween was assumed to be the value of the non-uniformity. C or more was determined as good.

Evaluation Criteria

A: image density non-uniformity less than 0.02%
B: image density non-uniformity 0.02% or more and less than 0.05%
C: image density non-uniformity 0.05% or more and less than 0.10%
D: image density non-uniformity 0.10% or more Examples 1 to 15

In Examples 1 to 15, toners 1 to 15 were used as toners, respectively, and the evaluation was performed. The evaluation results are shown in Table 5.

Comparative Examples 1 to 5

In Comparative Examples 1 to 5, toners 16 to 20 were used as toners, respectively, and the evaluation was performed. The evaluation results are shown in Table 5.

TABLE 5

| | | Low temperature low humidity environment | | Ordinary temperatures ordinary humidities environment | | |
|---|---|---|---|---|---|---|
| Example No. | Toner No. | Halftone density non-uniformity | Halftone streaks | Halftone density non-uniformity | Fogging | Image density |
| 1 | 1 | A | A | A | A | A |
| 2 | 2 | B | A | A | A | A |
| 3 | 3 | B | B | A | A | A |
| 4 | 4 | B | A | A | A | B |
| 5 | 5 | B | B | A | A | B |
| 6 | 6 | B | B | B | A | B |
| 7 | 7 | C | B | B | A | B |
| 8 | 8 | C | B | B | B | B |
| 9 | 9 | C | C | B | B | C |
| 10 | 10 | B | B | B | A | A |
| 11 | 11 | C | B | B | A | A |
| 12 | 12 | C | B | B | B | A |
| 13 | 13 | C | C | B | B | B |
| 14 | 14 | A | A | A | A | A |
| 15 | 15 | B | A | A | A | A |
| C.E. 1 | 16 | D | D | C | A | A |
| C.E. 2 | 17 | A | A | A | A | D |
| C.E. 3 | 18 | D | C | C | A | A |
| C.E. 4 | 19 | D | D | C | A | A |
| C.E. 5 | 20 | D | D | C | A | A |

In the table, "C.E." indicates "Comparative Example". In Examples 1 to 15, in any evaluation criterion, a good result was obtained. On the other hand, in Comparative Examples 1, and 3 to 5, regarding the evaluation item of the cleaning performance, the results inferior to those of Examples were obtained. Whereas, in Comparative Example 2, regarding the image density, the result inferior to that of Example was obtained.

From the results up to this point, the present disclosure can suppress the charging roller contamination due to the faulty cleaning and the image defect caused thereby under low temperature low humidity environment and under ordinary temperatures low humidities environment even when a large volume of printing is performed over a long period with a toner including a resin having the PET structure and a black pigment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-082367, filed May 18, 2023, which is hereby incorporated by reference herein in its entirety.

What is claimed is:

1. A toner comprising:

a toner particle comprising a pigment;

a resin particle; and an external additive, wherein a brightness average value on the basis of a monochrome 256 gradation of the resin particle is 90 to 120, and an average circle-equivalent diameter of the resin particle is 0.5 to 3.0 μm, a brightness average value on the basis of a monochrome 256 gradation of the toner particle is 40 to 80, the pigment is a black pigment, a number of the resin particle in the toner is 5 to 40 for every 100 toner particles, the toner particle comprises at a surface thereof a resin having a repeating structure of a structure expressed by formula (1) below, the resin particle comprises at a surface thereof a resin having a repeating structure of a structure expressed by formula (1) below, and in a load displacement curve obtained by micro compression measurement of the resin particle, 90 number % or more of the resin particle does not have a fracture point at a load within a range 0 to 10 mN.

(1)

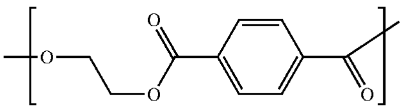

2. The toner according to claim 1, wherein m/z341 normalization intensity calculated by equation (A) below in time of flight secondary ion mass spectrometry under conditions (2) below of the resin particle is $2.50\times10^{-4}$ to $1.00\times10^{-2}$, m/z341 normalization intensity calculated by equation (A) below in time of flight secondary ion mass spectrometry under conditions (3) below of the resin particle is $2.50\times10^{-4}$ to $1.00\times10^{-2}$, $$m/z341 = \text{normalization intensity} = (\text{ion intensity of peak detected } m/z = 341)/(\text{total ion strength with } m/z = 0.5 \text{ to } 1850) \tag{A}$$

conditions (2): primary ion species: $Bi^{3++}$, acceleration voltage: 30 kV, measurement mode: Positive, Negative, measurement range: m/z=0.5 to 1850, raster size: 300×300 μm/256×256 pixel, and measurement time: 180 seconds conditions (3): measurement is performed under the conditions (2) after performing a sputtering treatment with Ar-GCIB under conditions below, Ar-GCIB conditions acceleration voltage: 5 kV current: 6.5 nA raster size: 600×600 μm irradiation time: 5 sec/cycle sputtering time: 500 seconds.

3. The toner according to claim 1, wherein a content ratio of the resin particle in a fine particle is 60 to 100 number %, where the fine particle represents a particle with a circle-equivalent diameter of 0.5 to 3.0 μm included in the toner.

4. The toner according to claim 1, wherein the toner comprises a fine particle in an amount of 10 to 40 number % based on a total amount of the toner particle and the resin particle where the fine particle represents a particle with a circle-equivalent diameter of 0.5 to 3.0 μm included in the toner.

5. The toner according to claim 1, wherein the toner particle comprises a binder resin, the binder resin comprises a polyester resin, the binder resin comprises, as a component configuring the polyester resin, a structure corresponding to ethylene glycol in an amount of 3 to 30 mass %, and, comprises a structure corresponding to terephthalic acid in an amount of 20 to 45 mass %.

6. The toner according to claim 1, wherein in a load displacement curve obtained by micro compression measurement of the toner particle, 80 number % or more of the toner particles each have a fracture point at a load within a range of 0 mN to 10 mN.

7. The toner according to claim 1, comprising a compound A and a compound B to be eluted in methanol, when the toner is subjected to an elution treatment under conditions A below, wherein when a supernatant obtained by centrifuging an effluent resulting from elution of the compound A and the compound B into the methanol under conditions of centrifugation conditions A below is analyzed by a liquid chromatograph ESI/MS under analysis conditions A below, the compound A included in the supernatant is detected as having been ionized to be a cation, and the compound B included in the supernatant is detected as an anion, elution conditions A: using methanol (JISK8891 standard equivalent product) in an amount of 10 times based on a mass of the toner at 25 °C, stirring is performed at a rotation speed of a rotor of 200 rpm for 10 hours by a stirrer, centrifugation conditions A: at 25 °C, rotation is performed at a rotation radius of 10.1 cm, and a rotation speed of 3500 rpm for 30 minutes, and analysis conditions A: one resulting from ionization under conditions of a capillary voltage: 35 V, and a tube lens voltage: 110 V is detected as a cation, and one resulting from ionization under conditions of a capillary voltage: −35 V and a tube lens voltage: −110 V is detected as an anion under the conditions of Sheath Gas: 10 (arb. unit), Aux Gas: 5 (arb. unit), spray voltage: 5 kV, capillary temperature: 275 °C.

8. The toner according to claim 7, wherein the compound A is at least one compound selected from the group consisting of an ethylene oxide adduct of straight chain aliphatic alcohol having 8 to 16 carbon atoms, and sodium polyoxyethylene lauryl ether acetate, and the compound B is linear chain type or branch type sodium dodecyl benzenesulfonate.

9. The toner according to claim 1, wherein the toner particle is an emulsion aggregation toner particle.

10. The toner according to claim 1, wherein the black pigment includes carbon black.

* * * * *